United States Patent
Alyousuf et al.

(10) Patent No.: US 11,561,312 B2
(45) Date of Patent: Jan. 24, 2023

(54) MAPPING NEAR-SURFACE HETEROGENEITIES IN A SUBTERRANEAN FORMATION

(71) Applicant: Saudi Arabian Oil Company, Dhahran (SA)

(72) Inventors: Taqi Yousuf Alyousuf, Dhahran (SA); Daniele Colombo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 287 days.

(21) Appl. No.: 16/715,807

(22) Filed: Dec. 16, 2019

(65) Prior Publication Data

US 2021/0181363 A1    Jun. 17, 2021

(51) Int. Cl.
*G01V 1/30* (2006.01)
*G01V 1/24* (2006.01)
(Continued)

(52) U.S. Cl.
CPC ............ *G01V 1/303* (2013.01); *G01V 1/24* (2013.01); *G01V 1/282* (2013.01); *G01V 1/284* (2013.01);
(Continued)

(58) Field of Classification Search
CPC .......... G01V 1/303; G01V 1/24; G01V 1/282; G01V 1/284; G01V 1/368; G01V 2210/21;
(Continued)

(56) References Cited

U.S. PATENT DOCUMENTS 5,136,552 A    8/1992    Kelly et al.
6,175,536 B1    1/2001    Khan
(Continued)

FOREIGN PATENT DOCUMENTS

CN    102112894    6/2011
EP    3232234    10/2017
(Continued)

OTHER PUBLICATIONS

PCT International Search Report and Written Opinion in International Appln. No. PCT/US2020/065042, dated Mar. 25, 2021, 15 pages.
(Continued)

*Primary Examiner* — Elias Desta
(74) *Attorney, Agent, or Firm* — Fish & Richardson P.C.

(57) ABSTRACT

Methods and systems for identifying near-surface heterogeneities in a subterranean formation using surface seismic arrays can include: recording raw seismic data using sensors at ground surface; applying a band bass filter to the raw seismic data using a central frequency; picking a phase arrival time for the filtered data; generating an initial starting phase velocity model for tomographic inversion from the raw seismic data; applying tomographic inversion to the filtered data to generate a dispersion map associated at the central frequency; repeating the applying a band bass filter, picking a phase arrival time, generating an initial starting velocity model, and applying tomographic inversion steps for each of a set of central frequencies; and generating a three-dimensional dispersion volume representing near-surface conditions in the subterranean formation by combining the dispersion maps.

20 Claims, 20 Drawing Sheets

(51) Int. Cl.
*G01V 1/28* (2006.01)
*G01V 1/36* (2006.01)

(52) U.S. Cl.
CPC .......... *G01V 1/368* (2013.01); *G01V 2210/21* (2013.01); *G01V 2210/42* (2013.01); *G01V 2210/6222* (2013.01); *G01V 2210/67* (2013.01)

(58) Field of Classification Search
CPC ........... G01V 2210/42; G01V 2210/67; G01V 2210/6222
See application file for complete search history.

(56) References Cited

U.S. PATENT DOCUMENTS

| | | | |
|---|---|---|---|
| 6,253,848 B1 | 7/2001 | Reimers et al. | |
| 6,778,907 B1* | 8/2004 | Washbourne | G01V 1/28 702/6 |
| 7,852,087 B2 | 12/2010 | Wilt et al. | |
| 8,209,126 B2* | 6/2012 | Berkovitch | G01V 1/28 702/16 |
| 8,553,497 B2 | 10/2013 | Krohn | |
| 8,760,966 B2* | 6/2014 | Laake | G01V 11/00 367/38 |
| 9,581,710 B2 | 2/2017 | Leiceaga | |
| 2006/0044940 A1 | 3/2006 | Hall et al. | |
| 2009/0039889 A1 | 2/2009 | Wilt et al. | |
| 2010/0128563 A1 | 5/2010 | Strobbia et al. | |
| 2011/0188347 A1 | 8/2011 | Thiercelin et al. | |
| 2012/0053839 A1 | 3/2012 | Kugler et al. | |
| 2012/0330554 A1 | 12/2012 | Ross et al. | |
| 2014/0257707 A1 | 9/2014 | Chavarria et al. | |
| 2016/0341839 A1 | 11/2016 | Kazinnik et al. | |
| 2017/0146681 A1 | 5/2017 | Cuevas et al. | |
| 2018/0136359 A1 | 5/2018 | Wilt et al. | |
| 2019/0195066 A1 | 6/2019 | Bakulin et al. | |
| 2021/0140307 A1 | 5/2021 | McNeice | |

FOREIGN PATENT DOCUMENTS

| | | |
|---|---|---|
| WO | WO2012087898 | 6/2012 |
| WO | WO2015108862 | 7/2015 |
| WO | WO2017040824 | 3/2017 |

OTHER PUBLICATIONS

PCT Invitation to Pay Additional Fees, and where applicable, Protest Fee in International Appln. No. PCT/US2020/059869, dated Mar. 2, 2021, 16 pages.
Alyousuf et al., "Surface-wave tomography to resolve water table: Almond Orchard case study, Modesto, California," SEG Technical Program Expanded Abstracts 2017, pp. 6093, Aug. 2017.
Baranwal et al., "3D modelling study of borehole-seafloor marine csem for shallow water case," 71st EAGE Conference and Exhibition, vol. 5, Jun. 8-11, 2009, 5 pages, pp. 1-5.
Caldwell et al., "Controlled source apparent resistivity tensors and their relationship to the magnetotelluric impedance tensor," Geophysical Journal, International vol. 151, Issue 3, Dec. 2002, 16 pages, pp. 755-770.
Colombo et al., "Quantifying surface-to-reservoir electromagnetics for waterflood monitoring in a Saudi Arabian carbonate reservoir," Geophysics vol. 78, Issue 6, pp. E281-E297, Nov.-Dec. 2013, 17 pages.
Colombo et al., "Surface to borehole CSEM for waterflood monitoring in Saudi Arabia: Data analysis," SEG Conference Technical Program, 2018, 5 pages.
Colombo et al., "Surface to Borehole Electromagnetics for 3D Waterflood Monitoring: Results from First Field Deployment," SPE Annual Technical Conference and Exhibition, SPE-191544-MS, pp. 1-16, Sep. 24-26, 2018.
Derode et al., "Recovering the Green's function from field-field correlations in an open scattering medium (L)," The Journal of the Acoustical Society of America, vol. 113 (6), pp. 2973-2976, Jun. 2003.
Dogru et al., "A next-generation parallel reservoir simulator for giant reservoirs," SPE Journal Paper 119272, presented at the Reservoir Simulation Symposium in the Woodlands, Texas, Feb. 2009, 29 pages.
Edwards et al., "On the theory of magnetometric resistivity (MMR) methods," Geophysics vol. 43, Issue 6, Oct. 1978, 28 pages.
Gouedard et al., "Surface wave eikonal tomography in heterogeneous media using exploration data," Geophys. J. Int. (2012) 191, 2, pp. 781-788, Nov. 2012.
Groom et al., "Decomposition of magnetotelluric impedance tensors in the presence of local three-dimentional galvanic distoriton," Journal of Geophysical Research, vol. 94, Feb. 10, 1989, 13 pages.
Hordt et al., "The effect of local distortions on time-domain electromagnetic measurements," Geophysics vol. 69, Issue 1, Jan.-Feb. 2004, 10 pages.
Jiracek, "Near-surface and topographic distortions in electromagnetic induction," Surveys in Geophysics vol. 11, 1990, 41 pages.
Jones, "Static shift of magnetotelluric data and its removal in a sedimentary basin environment," Geophysics vol. 53, Issue 7, Jul. 1988, 12 pages.
Lai et al., "Propagation of Data Uncertainty in Surface Wave Inversion," JEEG, Jun. 2005, 10, 2, pp. 219-228.
Luo et al., "Joint Inversion of High-Frequency Surface Waves with Fundamental and Higher Modes," Journal of Applied Geophysics 62, 4, pp. 375-384, Aug. 2007.
Marsala et al., "First Pilot of Borehole to Surface Electromagnetic in Saudi Arabia—A New Technology to Enhance Reservoir Mapping and Monitoring," SPE 146348, 73rd EAGE Conference and Exhibition, Oct. 30-Nov. 2, 2011, 9 pages.
McNeice et al., "Multisite, multifrequency tensor decomposition of magnetotelluric data," Geophysics vol. 66, No. 1, Jan.-Feb. 2001, 16 pages.
McNeice et al., "3D Inversion of Surface to Borehole CSEM for Waterflood Monitoring," Geophysics Technology, EXPEC Advanced Research Center, pp. 1-4, Oct. 16, 2018.
Newman, "Deep transient electromagnetic sounding with a grounded source over near-surface conductors," Geophysical Journal vol. 98, 1989, 15 pages.
Park et al., "Multichannel Anaylsis of Surface Waves (MASW)—Active and Passive Methods," The Leading Edge, 26, 1, pp. 1-6, Jan. 2007,.
Qian et al., "Near-surface distortion effects on controlled source magnetotelluric transfer functions," Geophysical Journal International, vol. 108, 1992, 15 pages.
Shapiro et al., "Emergence of broadband Rayleigh waves from correlations of the ambient seismic noise," Geophysical Research Letters, 31, 7, Apr. 16, 2004, pp. 1-4.
Shapiro et al., "High-resolution surface-wave tomography from ambient seismic noise," Science, 307(5715), Mar. 2005, pp. 1615-1618.
Socco et al., "Surface-wave analysis for building near-surface velocity models—Established approaches and new perspectives," Geophysics, 75, 5, pp. 75A83-75A102, Sep. 2010.
Tang et al., "Removal of galvanic distortion effects in 3D magnetotelluric data by an equivalent source technique," Geophysics, vol. 83, No. 2, Mar.-Apr. 2018, 16 pages.
Utada et al., "On galvanic distortion of regional three-dimensional magnetotelluric impedances," Geophysics Journal International, vol. 140, 2000, 14 pages.
Yao et al., "Surface-wave array tomography in SE Tibet from ambient seismic noise and two-station analysis—I. Phase velocity maps," Geophysical Journal International, vol. 166, Issue 2, Aug. 2006, pp. 732-744.
PCT International Search Report and Written Opinion in International Appln. No. PCT/US2020/059869, dated Apr. 28, 2021, 20 pages.
GCC Examination Report in GCC Appln. No. GC 2020-41148, dated Oct. 26, 2021, 5 pages.

(56) References Cited

OTHER PUBLICATIONS

GCC Examination Report in GCC Appln. No. GC 2020-40863, dated Oct. 7, 2021, 5 pages.

* cited by examiner

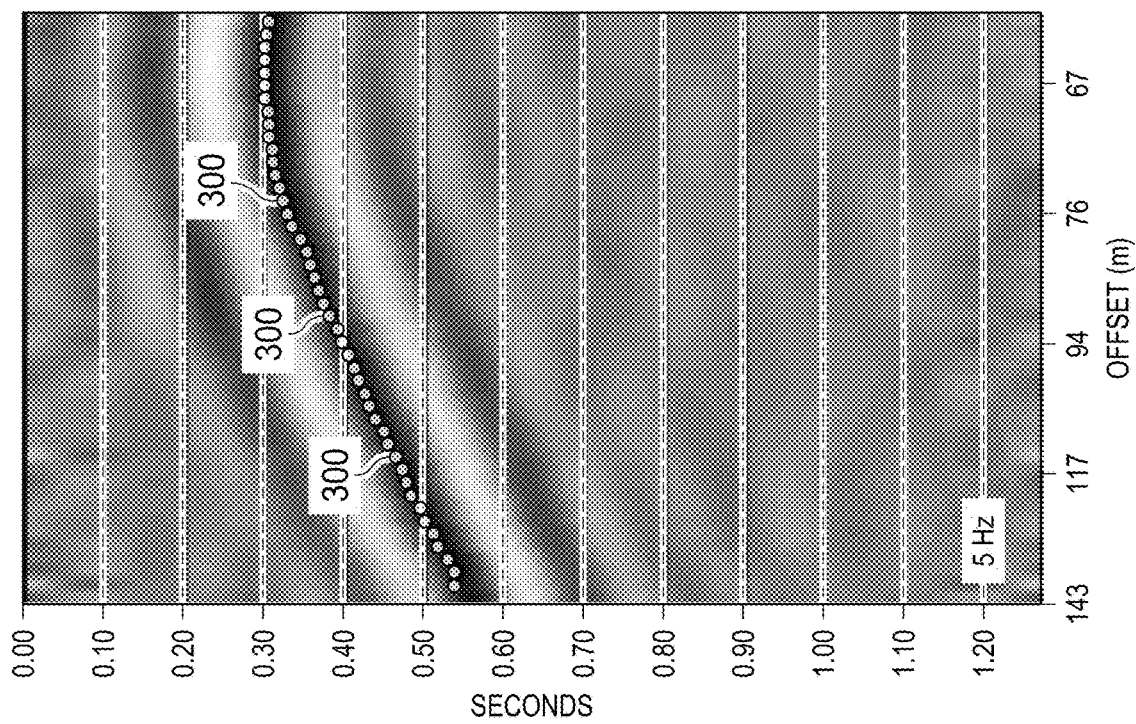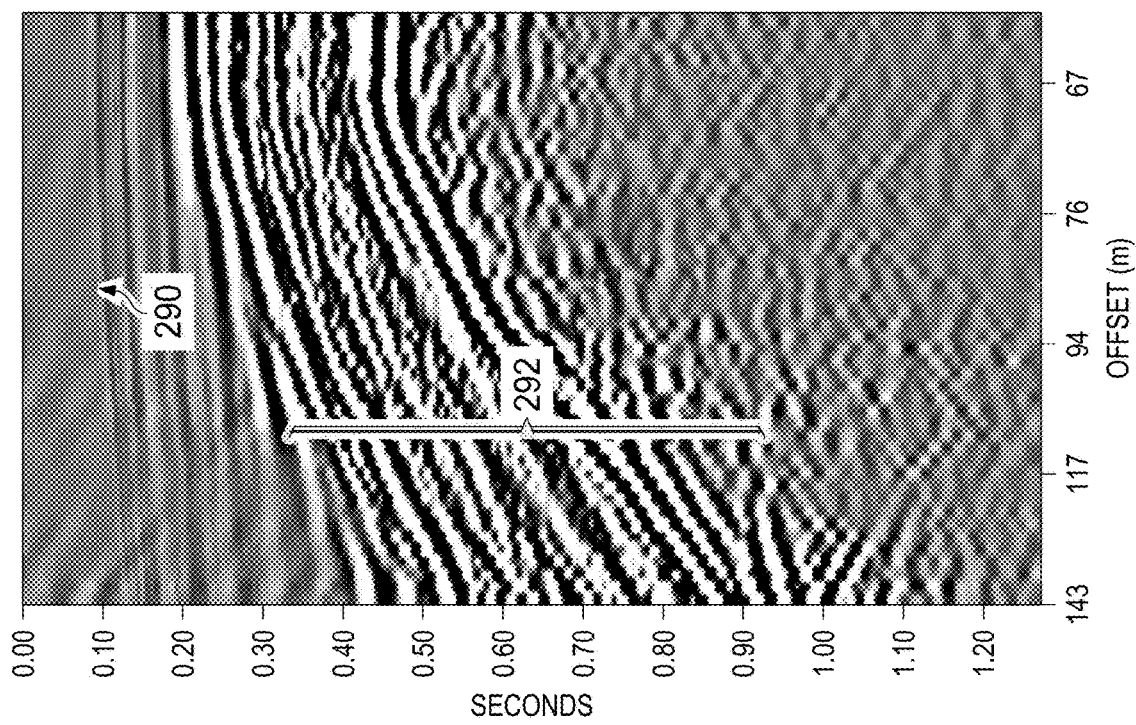

MAPPING NEAR-SURFACE HETEROGENEITIES IN A SUBTERRANEAN FORMATION

TECHNICAL FIELD

The present disclosure generally relates to seismic mapping of subterranean formations, particularly seismic mapping of near-surface heterogeneities in subterranean formations.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Seismic surface waves Rayleigh, Stoneley and Scholte surface waves are created at the interface between two media. In particular, Rayleigh surface waves are created at the interface between the Earth and air. Analysis of the time it takes seismic surface waves to travel from sources to sensors can provide information about near surface features. This analysis can also incorporate data from sources, for example, borehole logging, gravity surveys, and magnetic surveys.

SUMMARY

This specification describes systems and methods for mapping near-surface heterogeneities in a subterranean formation. Seismic acquisition layouts (that is, the arrangement of seismic shots and sensors) are typically designed to image deep reservoirs for hydrocarbon exploration. These systems and methods use cross shot line surface wave tomography to map near-surface heterogeneities in a subterranean formation using the raw seismic data generated by these seismic acquisition layouts. This approach generates tomographic maps associated with specific frequencies with each map representing a local average of the phase velocity at the associated frequency. The maps are combined to produce a dispersion volume. The dispersion volume shows spatial variations in the propagation speed of seismic surface waves, given travel times of seismic phases and the location of an associated source and receiver. Depth information is obtained by inverting the dispersion volume.

Some methods for identifying near-surface heterogeneities in a subterranean formation using surface seismic arrays include: recording raw seismic data using sensors at ground surface; applying a band bass filter to the raw seismic data using a central frequency; picking a phase arrival time for the filtered data; generating an initial starting phase velocity model for tomographic inversion from the raw seismic data; applying tomographic inversion to the filtered data to generate a dispersion map associated at the central frequency; repeating the applying a band bass filter, picking a phase arrival time, generating an initial starting velocity model, and applying tomographic inversion steps for each of a set of central frequencies; and generating a three-dimensional dispersion volume representing near-surface conditions in the subterranean formation by combining the dispersion maps.

Some methods for identifying near-surface heterogeneities in a subterranean formation using surface seismic arrays include: applying a band bass filter using a central frequency to raw seismic data associated with an array of seismic sources and seismic sensors at the ground surface; picking a phase arrival time for the filtered data; generating an initial starting velocity model for tomographic inversion from the raw seismic data; applying tomographic inversion to the filtered data to generate a dispersion map associated at the central frequency; repeating the applying a band bass filter, picking a phase arrival time, generating an initial starting velocity model, and applying tomographic inversion steps for each of a set of central frequencies; and generating a three-dimensional dispersion volume representing near-surface conditions in the subterranean formation by combining the dispersion maps.

Embodiments of these methods can include one or more of the following features.

In some embodiments, methods also include running a one-dimensional surface wave inversion on the three-dimensional dispersion volume to generate a shear wave velocity model representing near-surface conditions in the subterranean formation.

In some embodiments, the set of central frequencies comprises a plurality of equally spaced central frequency between 0 and 30 Hz.

In some embodiments, generating the initial starting velocity model for tomographic inversion from the raw seismic data comprises extracting a two-dimensional seismic profile from the raw seismic data. In some cases, generating the initial starting velocity model for tomographic inversion from the raw seismic data further comprises extracting a dispersion curve from the two-dimensional seismic profile by picking a fundamental mode in a frequency wavenumber domain. In some cases, generating the initial starting velocity model for tomographic inversion from the raw seismic data further comprises extracting a phase velocity extracted from the dispersion curve at a current central that frequency.

In some embodiments, recording raw seismic data using the sensors at ground surface comprises recording raw seismic data using an array of seismic sources and seismic sensors at the ground surface. In some cases, the array of seismic sources and seismic sensors at the ground surface comprises multiple shotlines and multiple receiver lines. In some cases, applying the band bass filter to the raw seismic data using the central frequency comprises applying the band bass filter to the raw seismic data associated with multiple shots from each shotline and multiple sensors from each receiver line using a central frequency.

In some embodiments, output of the tomographic inversion is a phase velocity volume at each spatial position and each discrete frequency.

The systems and methods described in this specification can detect small heterogeneities, such as sinkholes, located between two receiver lines of a seismic acquisition layout. In contrast, approaches to analyzing surface waves based on a one-dimensional (1D) assumption that the source and receiver are located on the same two-dimensional (2D) profile obtain a shear wave profile at specific shot location. For each shot line, the processor extracts data corresponding to the nearest shot to the receiver lines. The remaining shots are ignored since they violate the 1D assumption. The 1-D approach is not able to detect small heterogeneities located between receiver lines.

These systems and methods use 2D tomographic inversion to obtain velocity at specific frequency that is then converted to secondary wave (S wave) velocity as a function of depth. This approach is computationally cheaper than methods which use three-dimensional (3D) tomography. In addition, S-waves tomography is of higher resolution relative to P-wave tomography with the capability of discerning smaller near surface heterogeneities.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

FIGS. 8A-8D illustrate an example of picking phase arrival times.

FIG. 18 shows the resulting velocity-depth profile from inversion of surface waves.

Like reference symbols in the various drawings indicate like elements.

DETAILED DESCRIPTION

This specification describes systems and methods for mapping near-surface heterogeneities in a subterranean formation. Seismic acquisition layouts (that is, the arrangement of seismic shots and sensors) are typically designed to image deep reservoirs for hydrocarbon exploration. These systems and methods use cross shot line surface wave tomography to map near-surface heterogeneities in a subterranean formation using the raw seismic data generated by these seismic acquisition layouts. This approach generates tomographic maps associated with specific frequencies with each map representing a local average of the phase velocity at the associated frequency. The maps are combined to produce a dispersion volume. The dispersion volume shows spatial variations in the propagation speed of seismic surface waves, given travel times of seismic phases and the location of an associated source and receiver. Depth information is obtained by inverting the dispersion volume.

Figure 1:
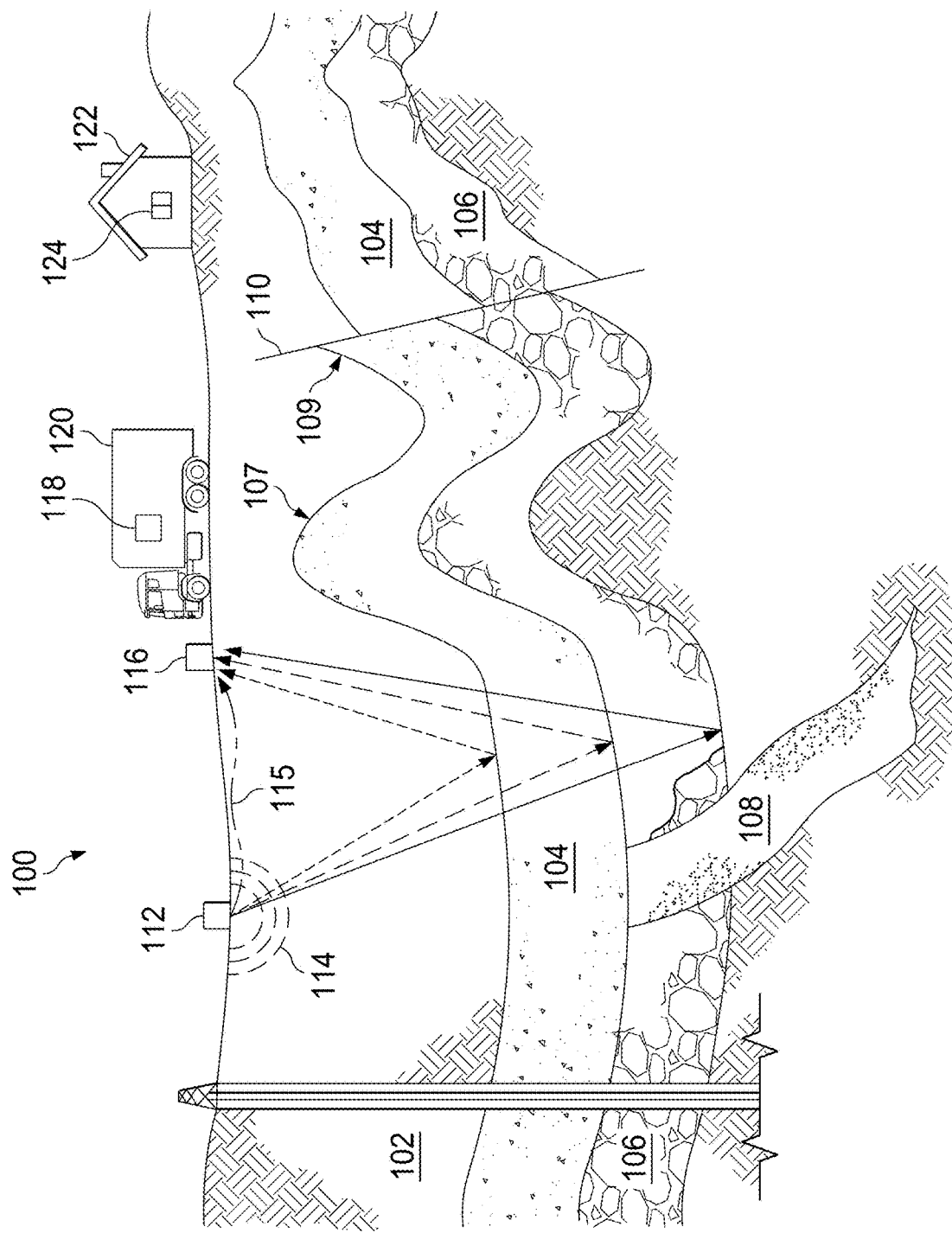
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
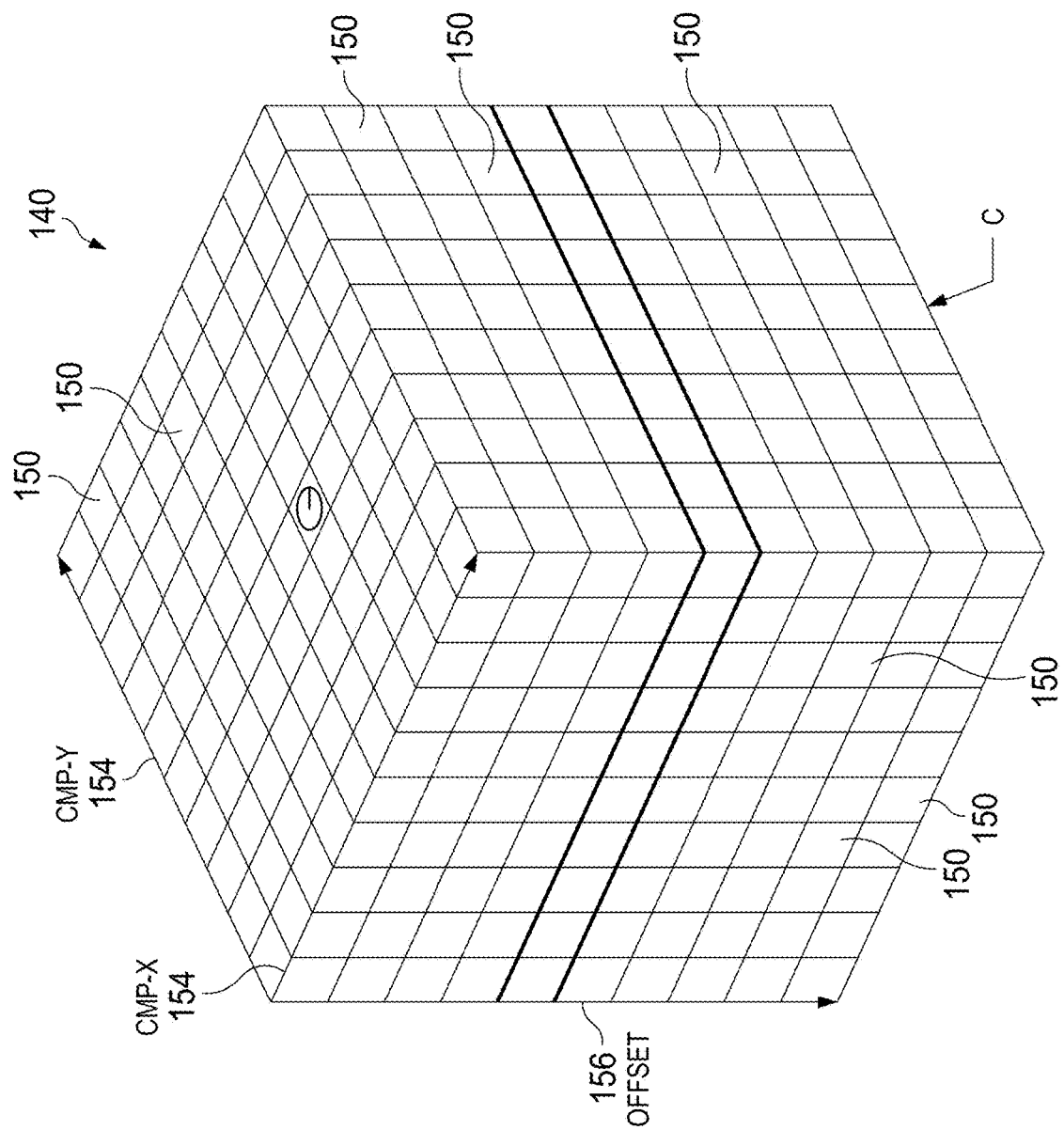
FIG. 2 illustrates a three-dimensional representation of the subterranean region where the seismic survey was performed.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
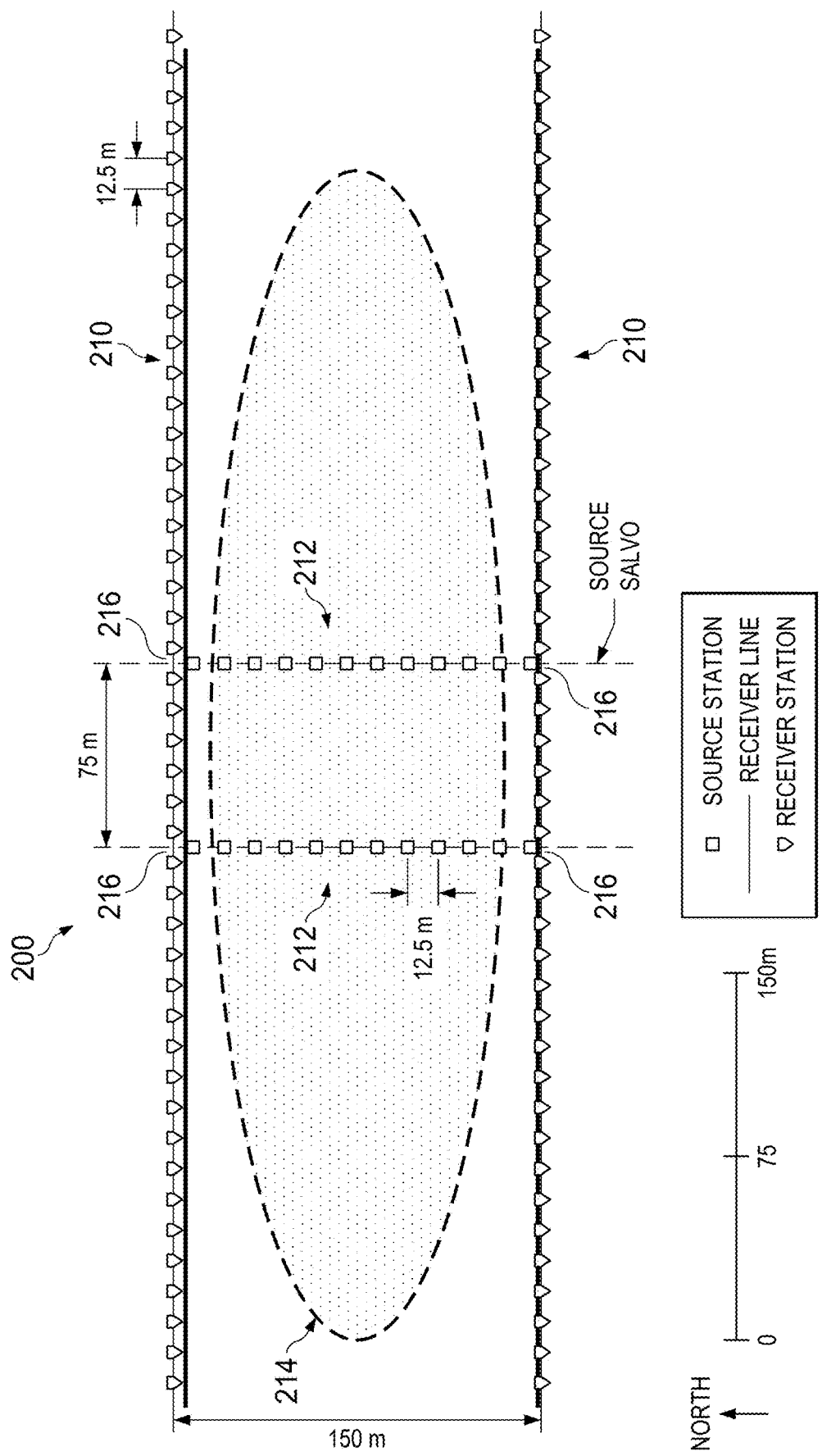
FIG. 3 is a schematic plan view of a seismic acquisition layout 200.

FIG. 3 is a schematic plan view of a seismic acquisition layout 200. The seismic acquisition layout 200 includes two receiver lines 210 and two shot lines 212. A heterogeneity 214 is present in the near surface region of the subterranean formation being investigated. The heterogeneity 214 is small enough that it is disposed between the two receiver lines 210. Such heterogeneities include, for example, dunes, karsts, wadis and other morphological/geologic surface feature that would introduce a distortion in the velocity field (velocity anomaly). The accurate mapping of the shallow velocities is significant as it affects the way deeper features are reconstructed in terms of accurate geometry and depth.

In the illustrated example layout, each of the receiver lines 210 include multiple geophones disposed in a straight line and spaced 12.5 meters (m) apart. The two receiver lines 210 are 150 m apart. Each of the shot lines 212 includes multiple shots disposed at a straight line and spaced 12.5 m apart. The shot lines 212 are 75 m apart. The shot lines 212 are perpendicular to the receiver lines 210. Both the geophones and the shots are located on the ground surface. Some seismic acquisition layouts have different spacing and orientations. The receivers and sources are most of the times located on the surface. Downhole sensors are possible but very expensive and almost never utilized for exploration.

In approaches to analyzing surface waves based on a one-dimensional (1D) assumption that the source and receiver are located on the same two-dimensional (2D) profile obtain a shear wave profile at specific shot location, a processor extracts only the data of the receiver line closest to the shot point to mimic a 2D profile geometry. In the seismic acquisition layout 200, only data recorded by the receiver lines 210 from the nearest shots 216 are extracted and used in a seismic shot gather. A large amount of surface wave information relative to the other shots is wasted because it violates the 1D assumption.

The extracted seismic data are then transformed from the time, offset (t, x) domain to the frequency, wavenumber (f, k) domain using the 2D Fourier transformation represented by Equation (1).

$$U(f, k) = \frac{1}{2\pi} \int_{-\infty}^{\infty} \int_{-\infty}^{\infty} u(x, t) \exp^{-i2\pi(ft-kx)} dx, dt \qquad (1)$$

The extracted seismic data are then transformed from the frequency, wavenumber (f, k) domain to the phase velocity spectrum using Equation (2).

$$v = f/k \qquad (2)$$

Figure 4A:
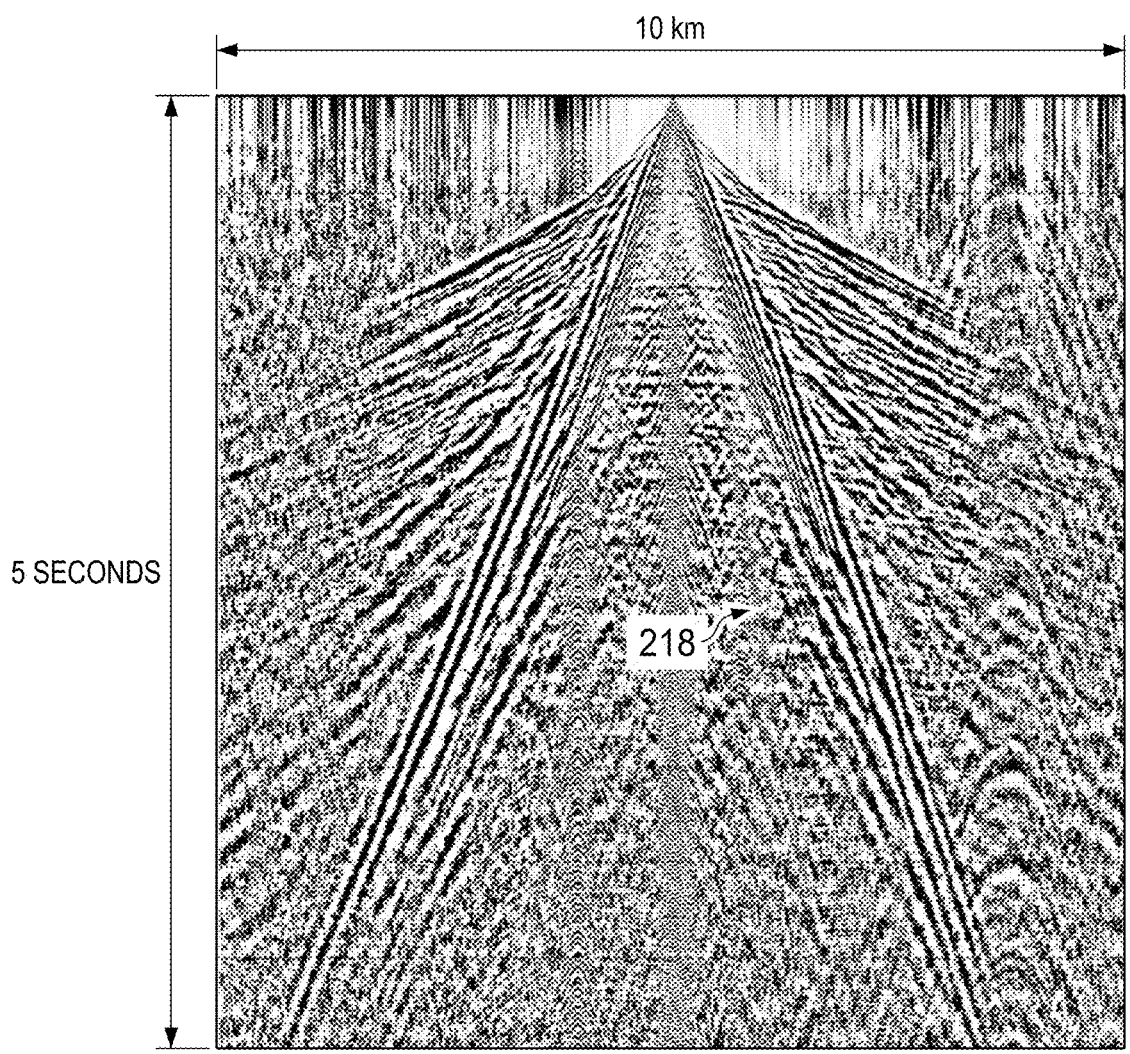
FIG. 4A is an example of one of these extracted shot gathers and FIG. 4B is an example of one of these extracted shot gathers in the frequency, wavenumber (f, k) domain.
Figure 4B:
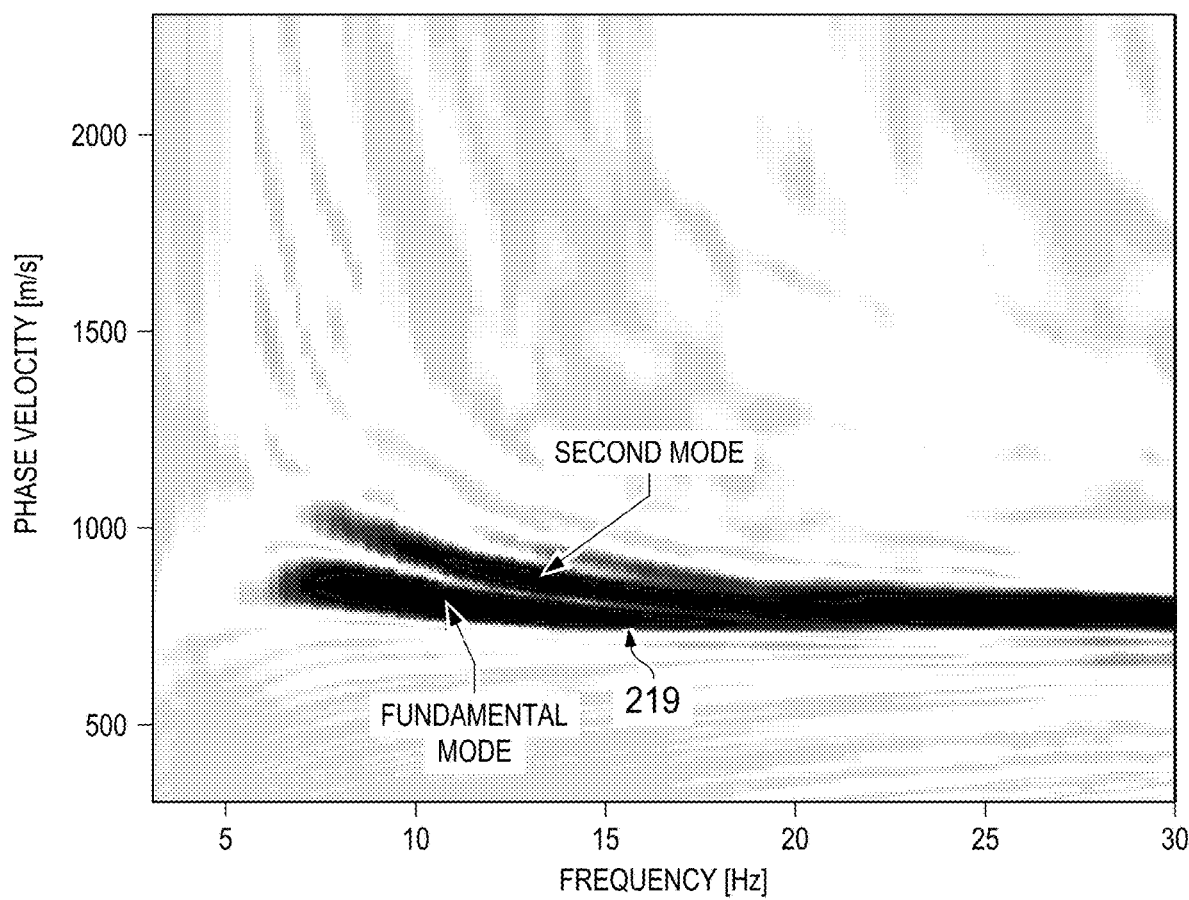

FIG. 4A is an example of one of these extracted shot gathers and FIG. 4B is an example of one of these extracted shot gathers in the phase velocity spectrum domain. Dispersion of the surface wave 218 is visible in in the extracted shot gather shown in FIG. 4A. Surface waves are dispersive meaning that the velocity changes with the frequency. Such effect is related to different depth of penetration of various frequencies that impinge deeper and deeper layers as the frequency decreases. The transformation to the fk domain is used commonly in seismic exploration to separate seismic events characterized by different frequencies and wavenumber. The fundamental mode 219 is picked by picking energy maxima in the phase velocity, frequency domain, which is very sensitive to shear wave velocity. FIG. 4B describes a standard transform from time-offset to frequency-wavenumber and to frequency-phase velocity. This is standard. The fundamental mode is easiest to recognize so it is typically picked on all the gathers. We focus the attention to the fundamental mode.

Figure 5:
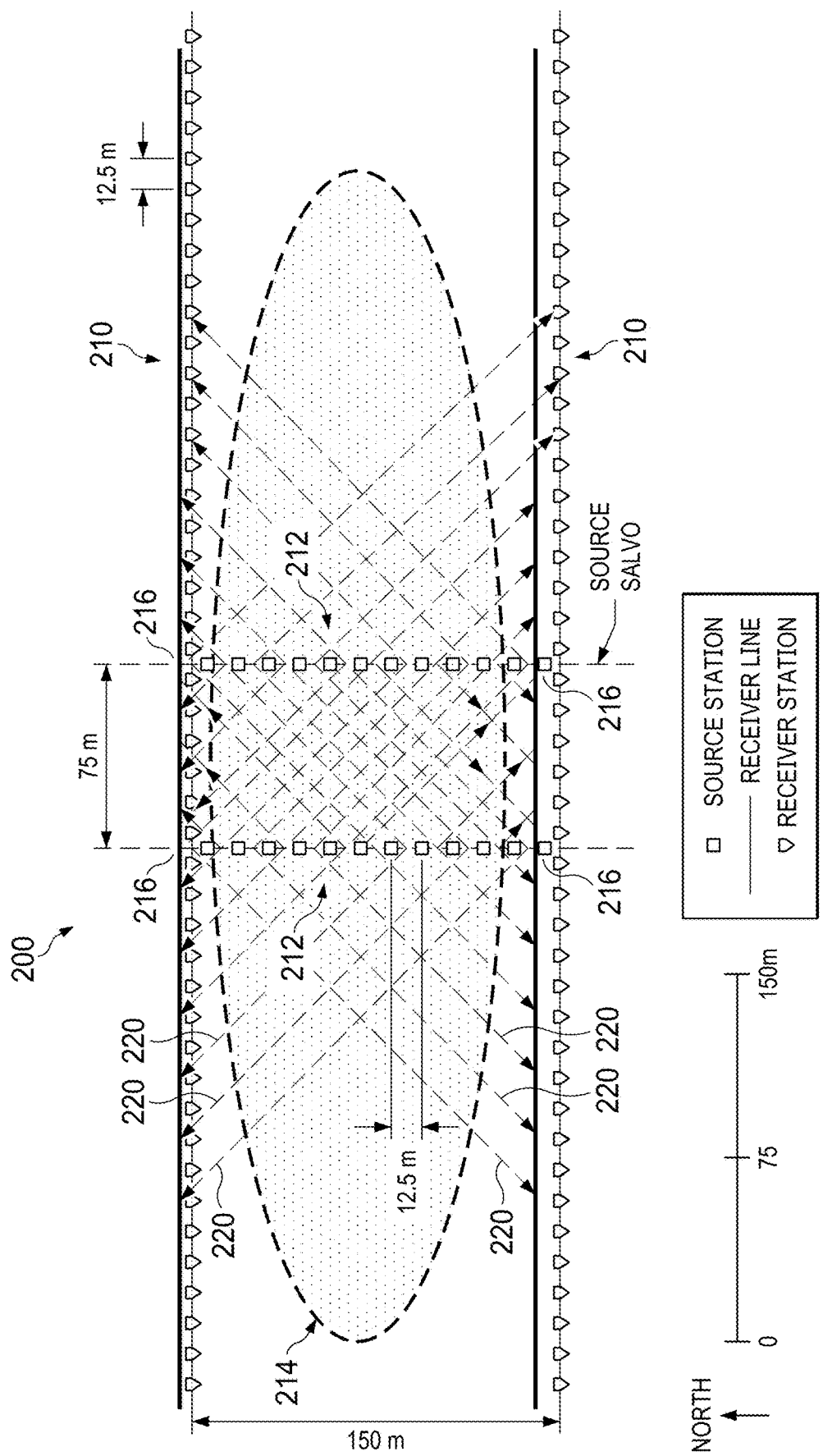
FIG. 5 illustrates using cross shot line surface wave tomography to map near-surface heterogeneities in a subterranean formation

FIG. 5 illustrates using cross shot line surface wave tomography to map near-surface heterogeneities in a subterranean formation using the raw seismic data generated by the seismic acquisition layout 200. Some of the surface wave ray paths 220 between the shots and receivers are schematically shown superimposed on the seismic acquisition layout 200. In contrast to the 1D-based approach, this approach incorporates data from multiple surface wave ray paths 220 traveling through the heterogeneity 214.

Figure 6:
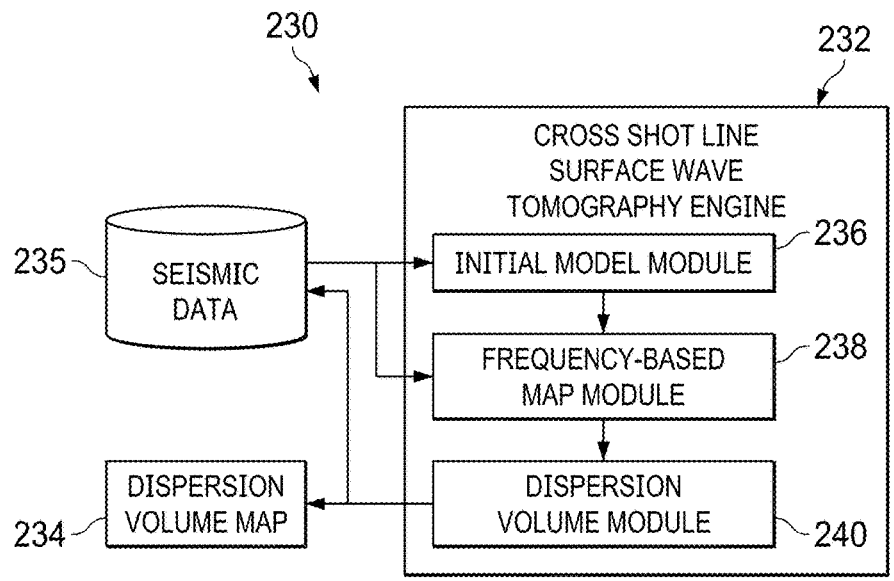
FIG. 6 is a block diagram of system 230 that can be used to implement a cross shot line surface wave tomography method based on 3D seismic acquisition data.
Figure 7:
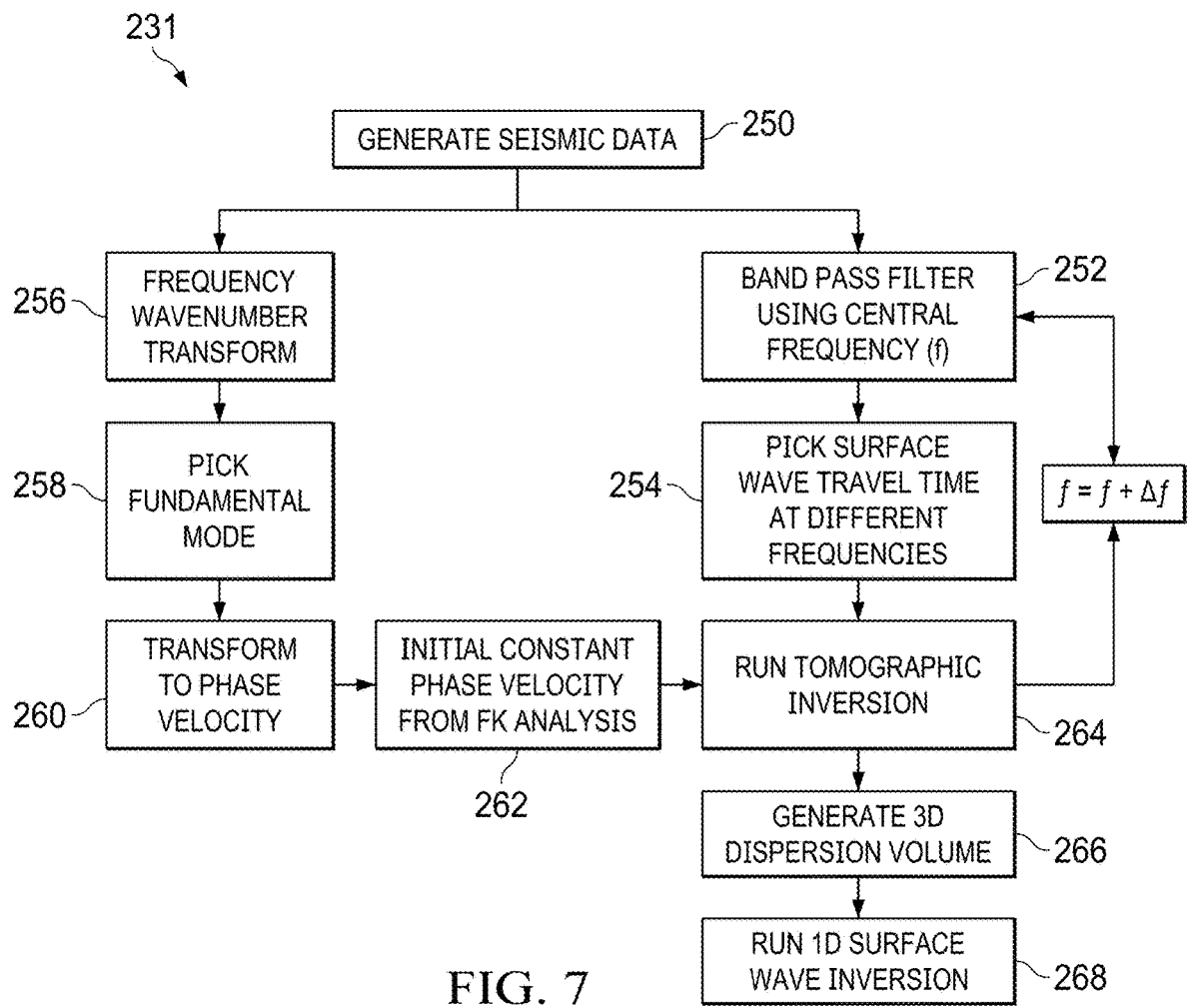
FIG. 7 is a flow chart of a method 231 that can be used to implement a cross shot line surface wave tomography method based on 3D seismic acquisition data.

FIG. 6 is a block diagram of system 230 that can be used to implement a cross shot line surface wave tomography method based on 3D seismic acquisition data. FIG. 7 is a flow chart of a method 231 that can be used to implement a cross shot line surface wave tomography method based on 3D seismic acquisition data.

The system 230 uses a cross shot line surface wave tomography engine 232 to produce a dispersion volume map 234 based on seismic data 235. The system 230 includes an initial model module 236, a frequency-based map module 238, and a dispersion volume module 240. As described in more detail in the following description of the method 231, the initial model module 236 receives seismic data 235 and generates an initial constant phase velocity model for the portion of the subterranean formation being mapped. The frequency-based map module 238 receives the initial constant phase velocity model from the initial model module 236 as well as seismic data 235 in generates a series of tomographic maps associated with specific frequencies. A dispersion volume module 240 combines these tomographic maps to generate a dispersion volume map 234. The dispersion volume map 234 can be used, for example, to The dispersion volume provides a 3D representation for the heterogenous subsurface with spatial variations. This allows the interpreter to identify anomalies such as karst features or anomalous bodies that cause changes in velocity. The data generated by the cross shot line surface wave tomography engine 232 is also incorporated in the seismic data associated with the portion of the subterranean formation being mapped.

The following description of the method 231 refers to both FIG. 6 and FIG. 7.

A seismic layout (for example, seismic layout 2 shown in FIG. 3) is used to generate seismic data (step 250). The frequency-based map module 238 bandpass filters the raw seismic data for a narrow band of frequencies using a center frequency and smooth passband cutoffs±1 hertz (Hz) from the center frequency and stopband frequencies of ±4 Hz from the center frequency (step 252). The center frequencies are selected by the user based on the available data by determining the minimum and maximum frequency band of the data and frequency interfal (Δf) to determine the central frequencies. The illustrated experiment analyzed a total of 11 central frequencies, ranging from 5 to 30 using a 2.5 Hz interval.

After filtering, high-amplitude responses consistent in all shot gathers are picked as the phase arrival times for frequencies ranging from 5 to 15 Hz (step 254). The picking operation can be either manual or automatic based on some algorithm. In this context, high-amplitude responses are the signals with the greatest amplitude.

Figure 8D:
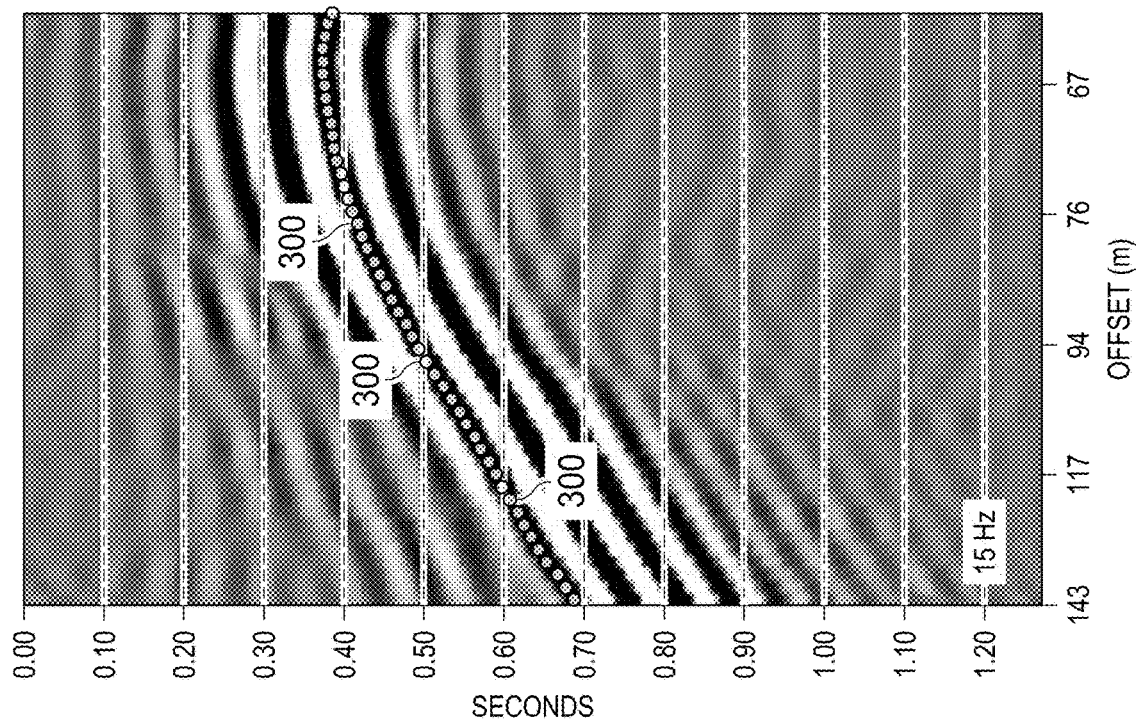
Figure 8C:
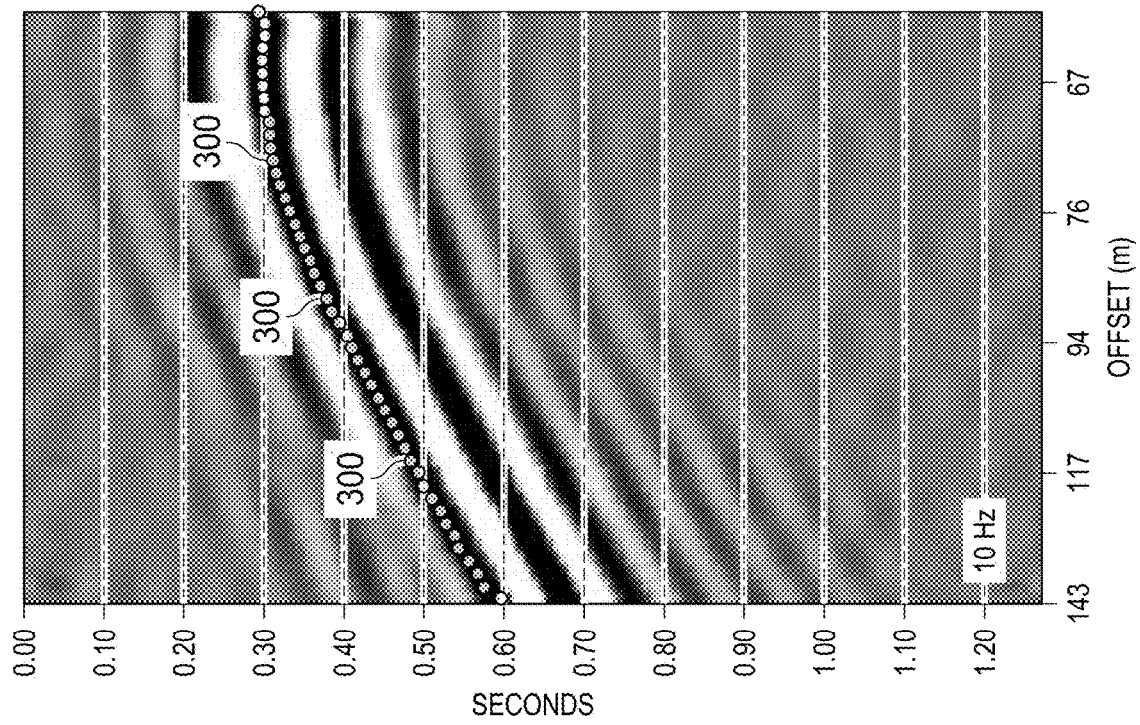

FIGS. 8A-8D illustrate an example of picking phase arrival times. FIG. 8A is a representative raw shot gather without filtering. The first arriving waves 290 are observed at ~-0.1-0.2 seconds. Rayleigh surface waves 292 are clearly visible in this shot gather. FIGS. 8B-8D present the raw shot gather bandpass filtered at 5, Hz, 10 Hz, and 15 Hz, respectively. The points 300 on FIGS. 8B-8D represent surface waves phase arrival time picks at each central frequency.

The initial model module 236 generates an initial constant phase velocity model that the frequency-based map module 238 uses as a starting point for tomographic inversion of the surface wave phase arrival times. The initial model module 236 receives raw seismic data representing the near surface subterranean formation, extracts a 2D seismic profile from the 3D seismic data, and performs a frequency wavenumber transformation to convert the data (step 256). The initial model module 236 extracts a dispersion curve by picking the fundamental mode (the points with the highest amplitude) in the frequency wavenumber domain (step 258) and transform the fundamental mode to a phase velocity (step 260). The initial model module 236 performs frequency wavenumber analysis on the results of this transformation to generate an initial constant phase velocity (step 262).

Figure 9:
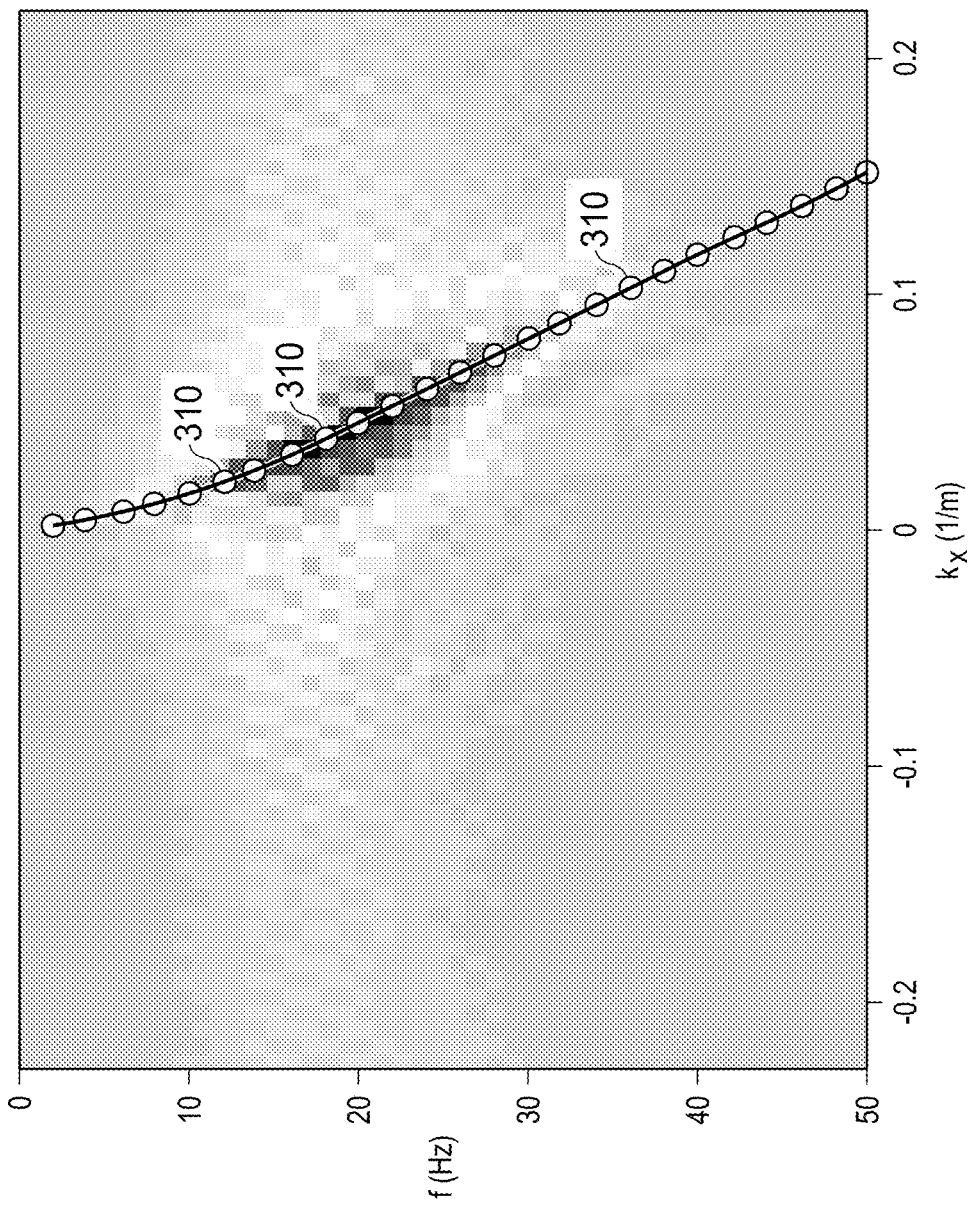
FIG. 9 illustrates a 2D seismic profile extracted from the 3D seismic data and transformed into the frequency wavenumber domain.

FIG. 9 illustrates a 2D seismic profile extracted from the 3D seismic data and transformed into the frequency wavenumber domain.

Figure 10:
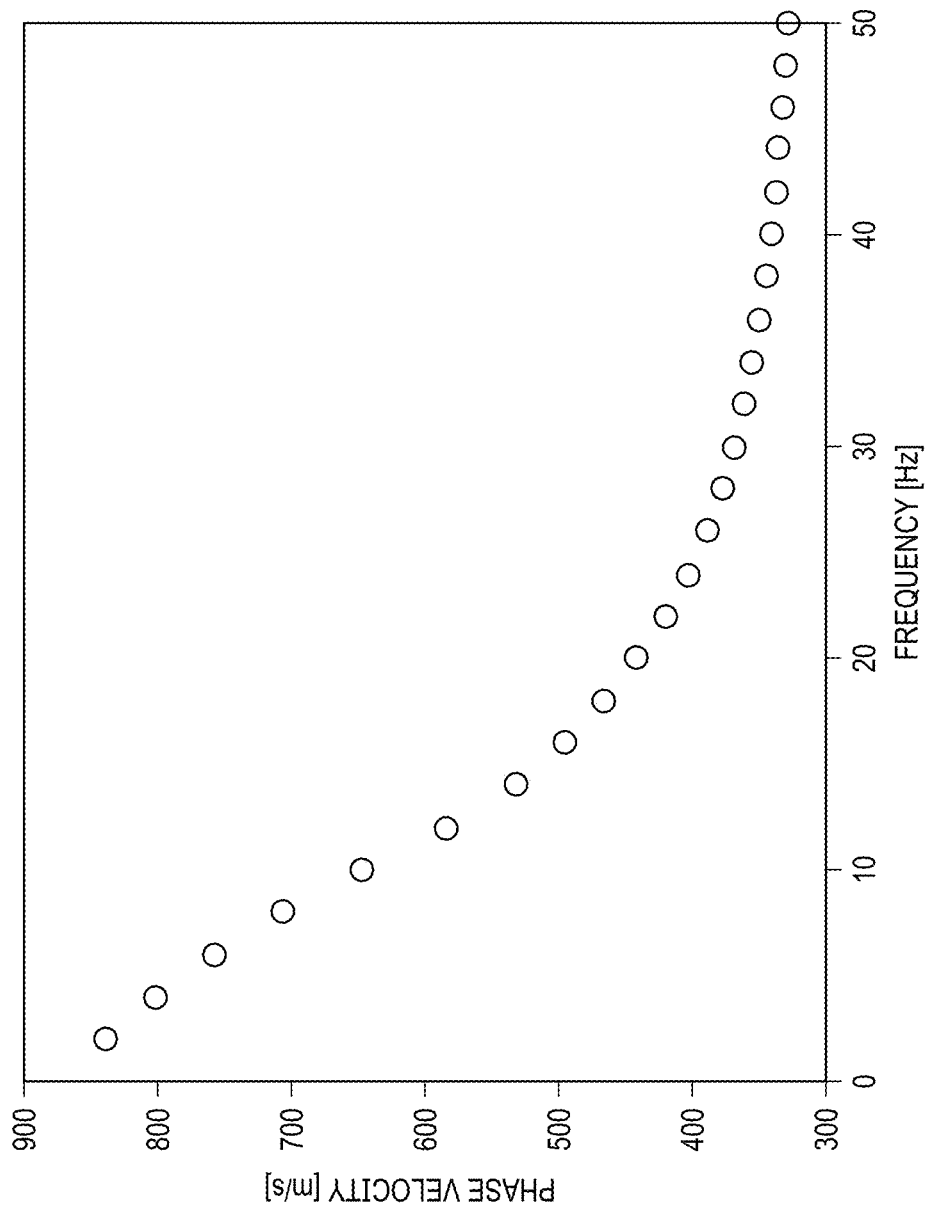
FIG. 10 illustrates the phase velocity generated by transforming the fundamental mode shown in FIG. 9 to a phase velocity.

The points 310 on the profile indicate the fundamental mode in the frequency wavenumber domain. FIG. 10 illustrates the phase velocity generated by transforming the fundamental mode shown in FIG. 9 to a phase velocity. The phase velocity in FIG. 10 is used as an initial model for the tomographic inversion for different central frequencies. For example, when inverting for 5 Hz central frequency, 750 m/s was used as a starting constant phase velocity for the tomographic inversion. This helps the tomographic inversion to converge faster to the correct phase velocity model at 5 Hz.

For each central frequency, the frequency-based map module 238 uses the phase velocity extracted from the dispersion curve at that frequency as the initial model for tomographic inversions in the tomography for a specific central frequency (step 264). In effect, the phase arrival times are inverted to phase velocity dispersion maps using 2D travel time tomography. This approach estimates spatial variations in the propagation speed of seismic waves, given travel times of seismic phases and the location of source and receiver and can be represented by Equation 3

$$t(r_s, r_r) = \int \frac{K(r, r_s, r_r)}{c(r)} dr \qquad (3)$$

in which t is the travel time from a source in position $r_s$ to a receiver in position $r_r$, r is an arbitrary point in the medium, c(r) is the phase velocity to be recovered, and K is the integration kernel. In surface wave tomography, the phase times are provided and the phase velocity dispersion maps are generated. The output of the tomographic inversion is a phase velocity (dispersion) volume at each spatial position and each discrete frequency.

Figure 11:
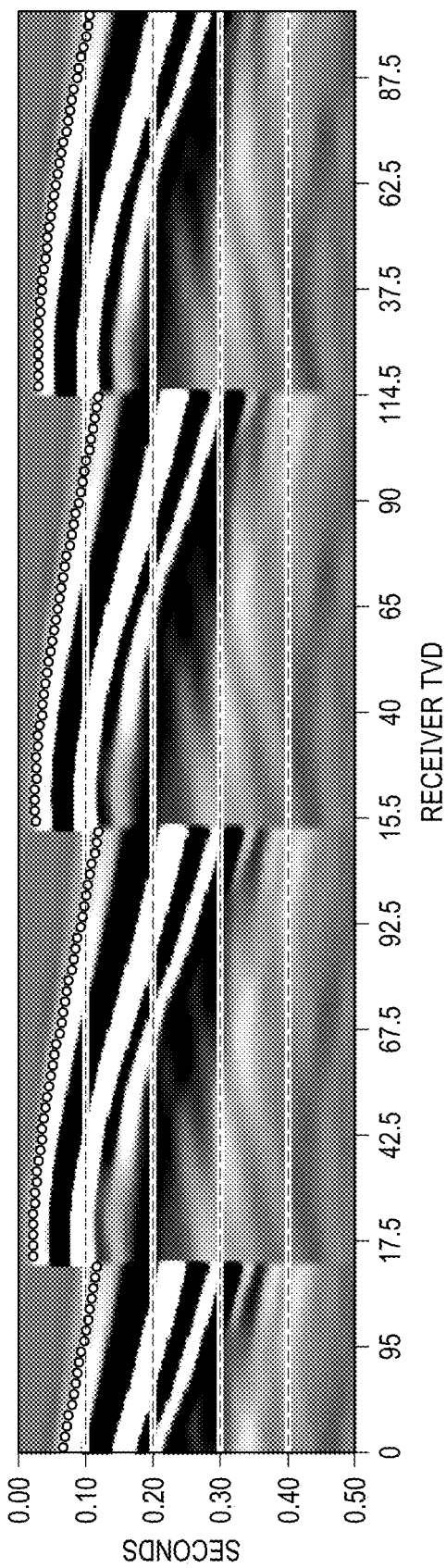
FIG. 11 illustrates examples of picked travel times on seismic gathers.

FIG. 11 illustrates the first arrival picking of surface waves at frequency.

The previously discussed steps are repeated for each central frequency to generate a tomographic map associated with each frequency. In the implementation illustrated in FIG. 7, the initial frequency (f) is incremented by a set amount ($\Delta f$) for each iteration. In some implementations, other approaches to choosing the central frequencies are used.

The dispersion volume module 240 combines the tomographic maps generated by the frequency-based map module 238 to generate a dispersion volume map 234 (step 266). For each spatial pixel in the dispersion volume, a dispersion curve is extracted that is used in conventional surface wave inversion to recover the subsurface velocity. The dispersion volume map shows spatial variations in the propagation speed of seismic surface waves, given travel times of seismic phases and the location of an associated source and receiver. Depth information is obtained by inverting the dispersion volume (step 268). One dimensional surface wave inversion is applied at each spatial position to obtain a 3D shear wave velocity model.

The method 231 was tested on a synthetic data set. The synthetic data set for test were generated using a time domain 3D elastic finite difference software. An explosive source with a Ricker wavelet was used to generate a source time function with a source frequency of 20 Hz. The grid used an equally spaced mesh spacing of 0.5 m with 200 cells in the core area and 30 cells on each side of the grid. This corresponds to 8 grid points per shortest wavelength with a minimum wavelength of 4 m. The average receiver spacing was 2.5 m. Heterogeneous Vs and Vp models assuming a Poisson's ratio=0.25 were generated based on an isotropic fractal model.

Figure 12:
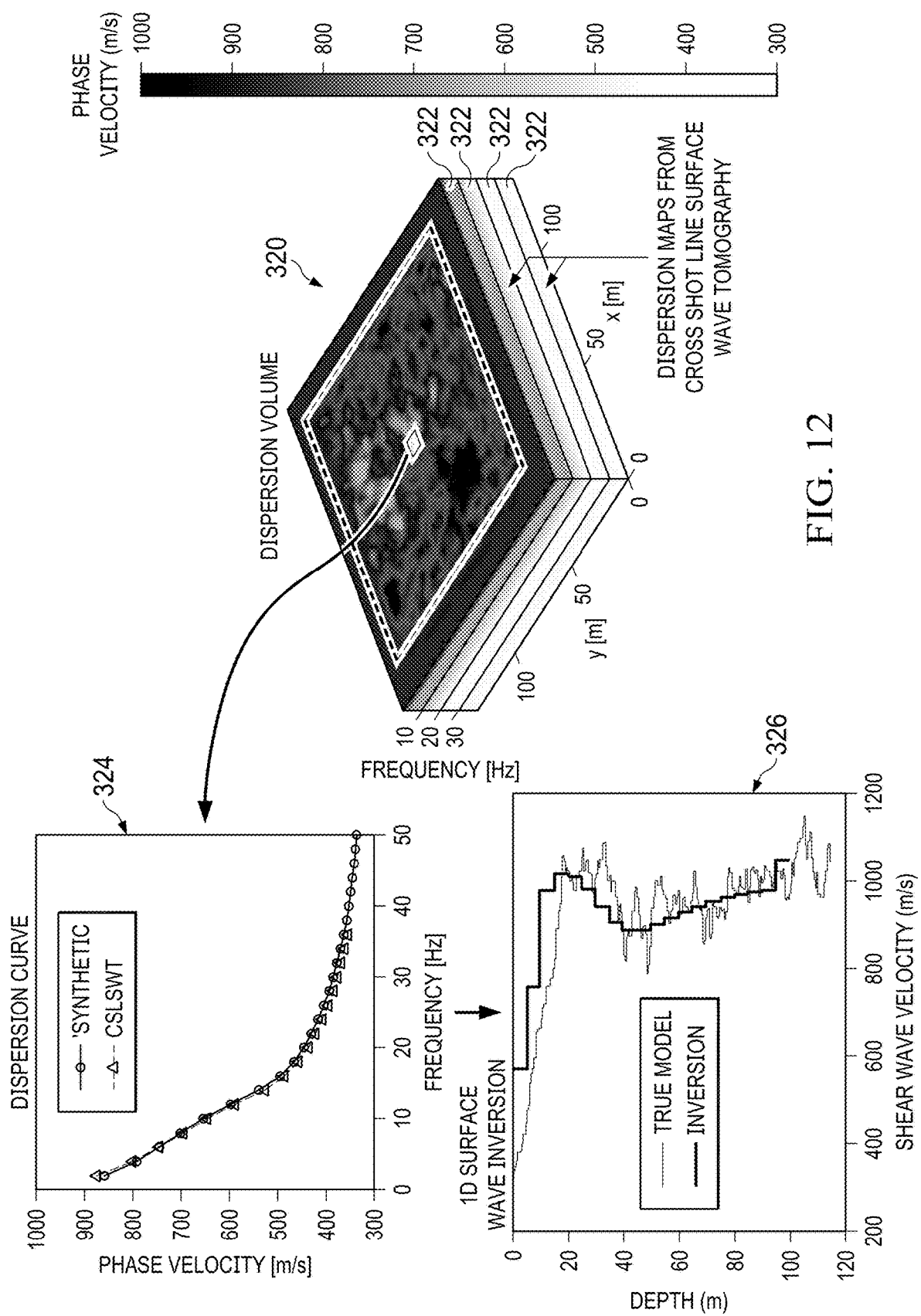
FIG. 12 presents the phase velocity dispersion volume generated using dispersion maps generated using cross shot line surface wave tomography on a synthetic data set.

FIG. 12 presents the phase velocity dispersion volume 320 generated using dispersion maps 322 generated using cross shot line surface wave tomography on the synthetic data set. A dispersion curve is extracted at the center of the dispersion volume demonstrated good agreement with synthetic dispersion curves using analytical solution in both the frequency—phase velocity domain 324 and in the shear wave velocity—depth domain 326.

The surface waves were processed by bandpass filtering data to a narrow band of frequencies using a center frequency and smooth passband cutoffs±1 Hz from the center frequency and stopband frequencies of ±4 Hz from the center frequency. Phase arrival times were picked for frequencies ranging from 4 to 35 Hz with 2 Hz intervals.

The two dimensional spatial tomographic methods described previously were used to produce the tomographic dispersion maps 322. The initial phase velocity model for the tomography was a constant phase velocity model for each frequency obtained by picking dispersion curves in the f-k domain from a 2D profile shot gather. The output of the surface wave tomography inversion for each frequency was a tomographic dispersion map 322 that form a dispersion volume of phase velocity (FIG. 7).

Figure 13:
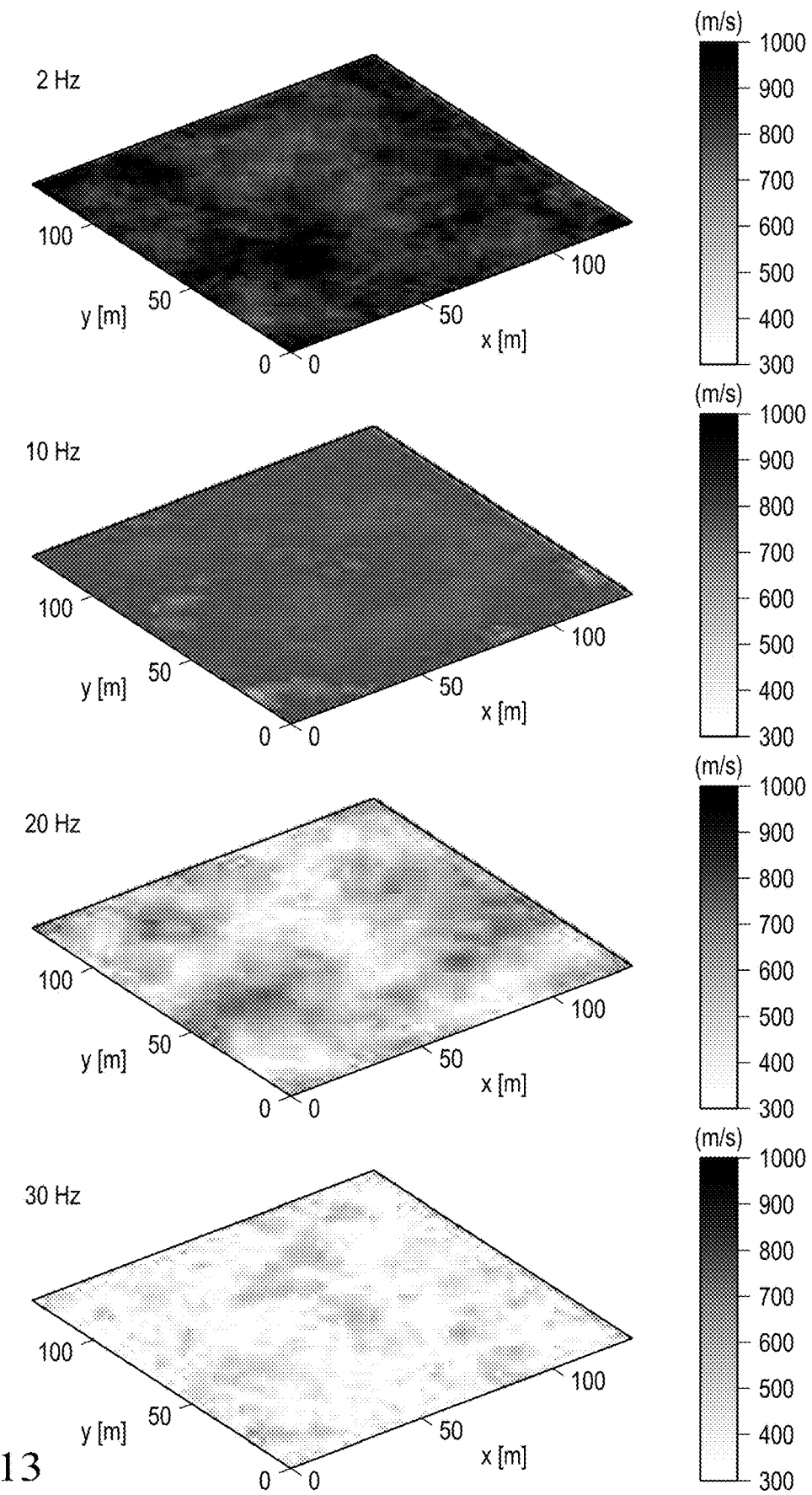
FIG. 13 presents phase velocity dispersion maps based on the synthetic data at 2, 10, 20, and 30 Hz.
Figure 14:
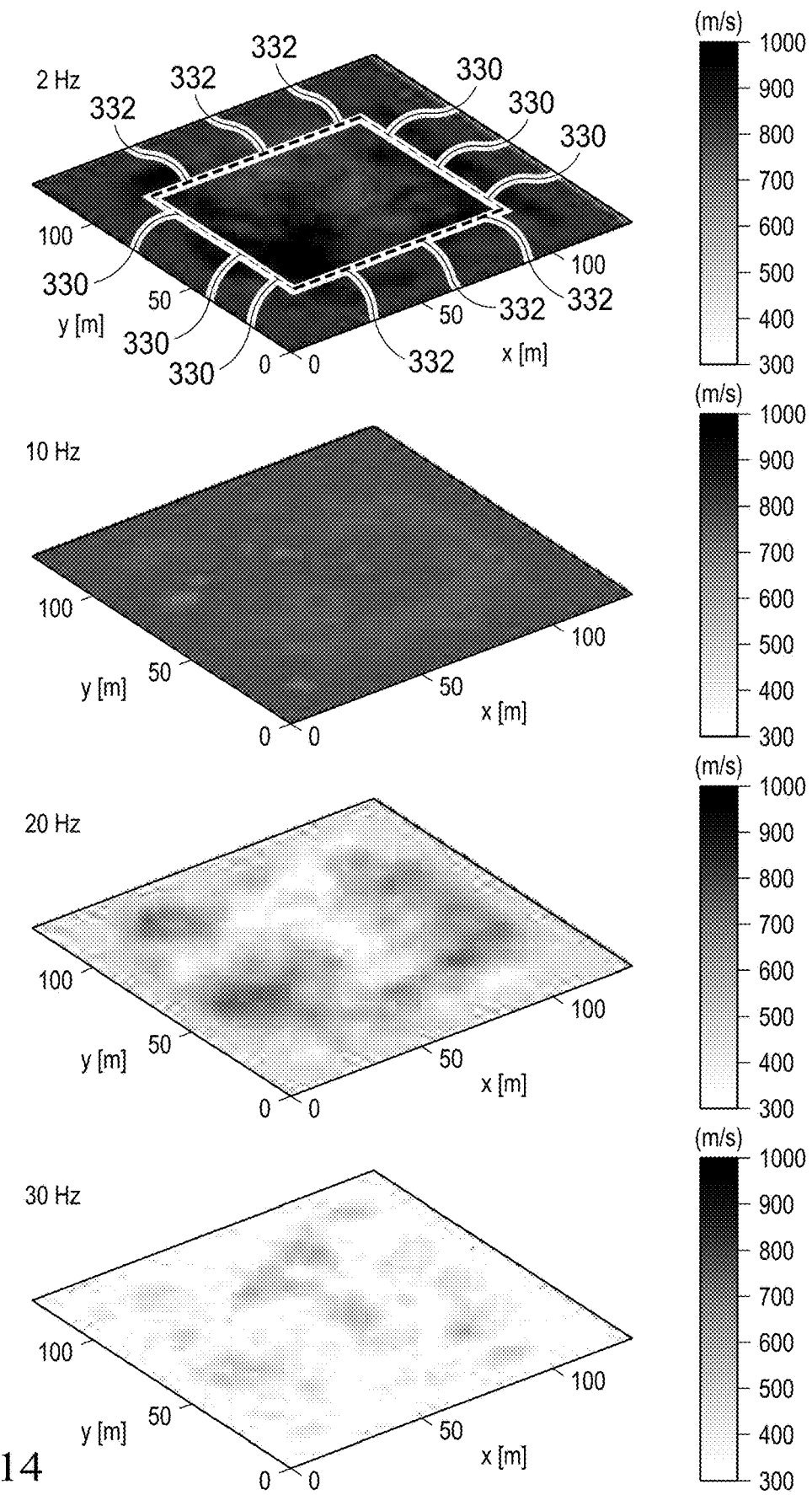
FIG. 14 presents phase velocity dispersion maps obtained using cross shot line surface wave tomography at 2, 10, 20, and 30 Hz.

FIG. 13 presents phase velocity dispersion maps based on the synthetic data at 2, 10, 20, and 30 Hz. FIG. 14 presents phase velocity dispersion maps obtained using cross shot line surface wave tomography at 2, 10, 20, and 30 Hz. The positions of the shots 330 and the receivers 332 are indicated on the 2 Hz phase velocity dispersion map. As can be observed, the phase velocity dispersion maps obtained using cross shot line surface wave tomography closely match the synthetic data. Comparison of the synthetic data and the cross shot line surface wave tomography maps for different frequencies shows that a low phase velocity model corresponds to low frequencies. In general, this approach provides smoother model than the true model, but it captures the spatial continuity of the true model and it has no sensitivity outside the acquisition geometry.

Figure 15:
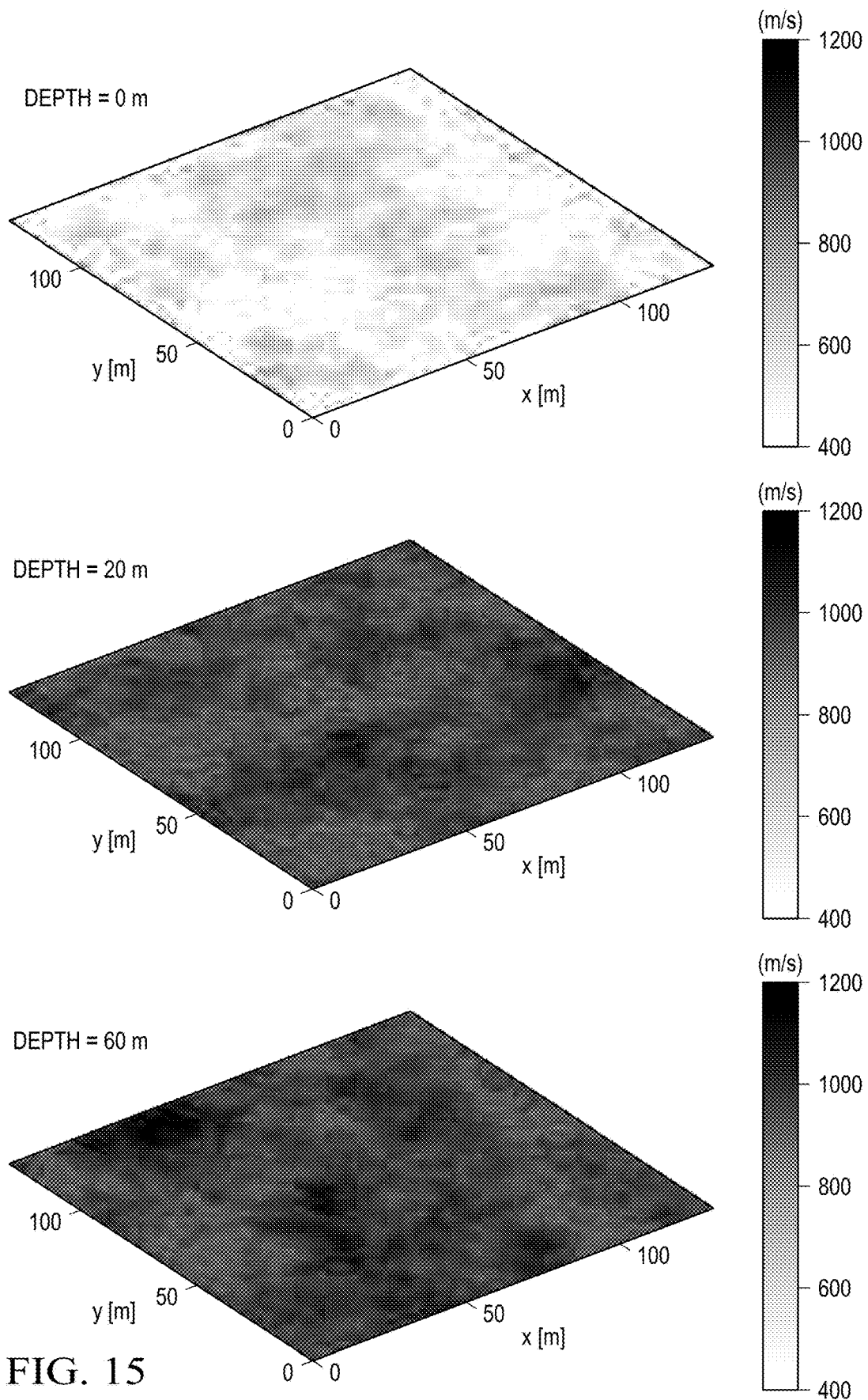
FIG. 15 shows the shows the true shear wave velocity in the synthetic data at depths of 0 meters (m), 20 m and 60 m.
Figure 16:
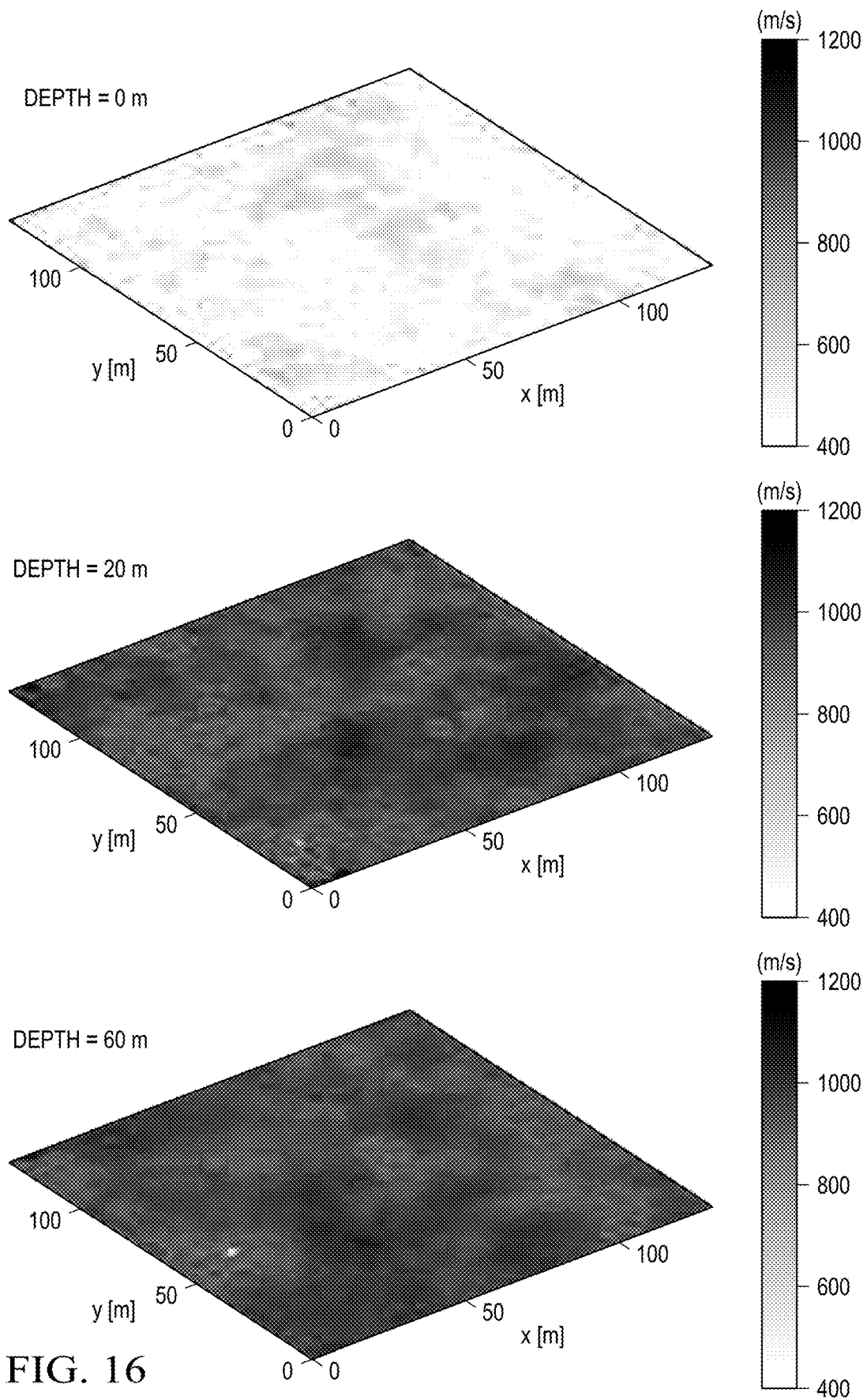
FIG. 16 shows the shows the true shear wave velocity generated by the inversion results of the cross shot line surface wave tomography at depths of 0 m, 20 m and 60 m.

FIG. 15 shows the shows the true shear wave velocity in the synthetic data at depths of 0 m, 20 m and 60 m. FIG. 16 shows the shows the true shear wave velocity generated by the inversion results of the cross shot line surface wave tomography at depths of 0 m, 20 m and 60 m. The recovered shear wave velocity model agrees well with the true model but sensitivity of the model decreases as depth increases.

Figure 17:
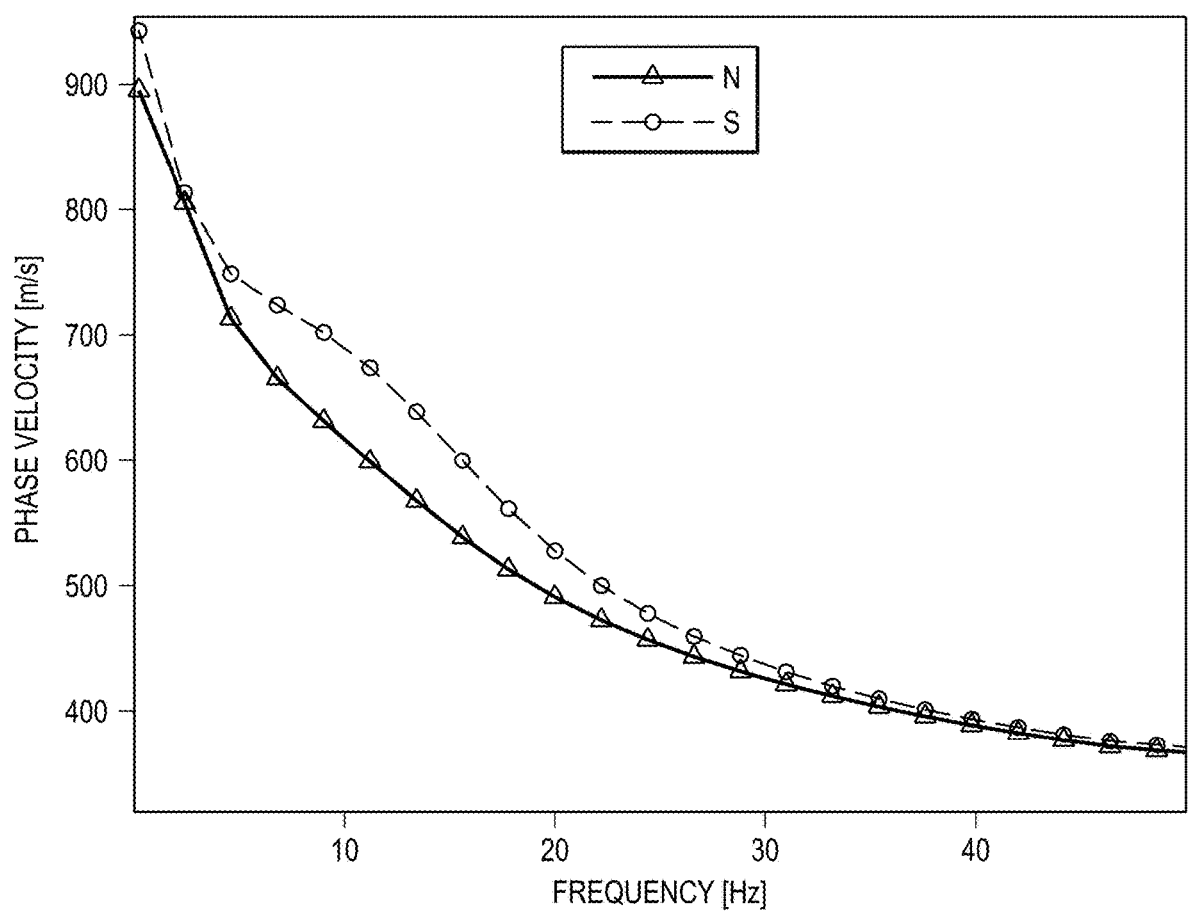
FIG. 17 presents the dispersion curves generated using a 1D approach.
Figure 18:
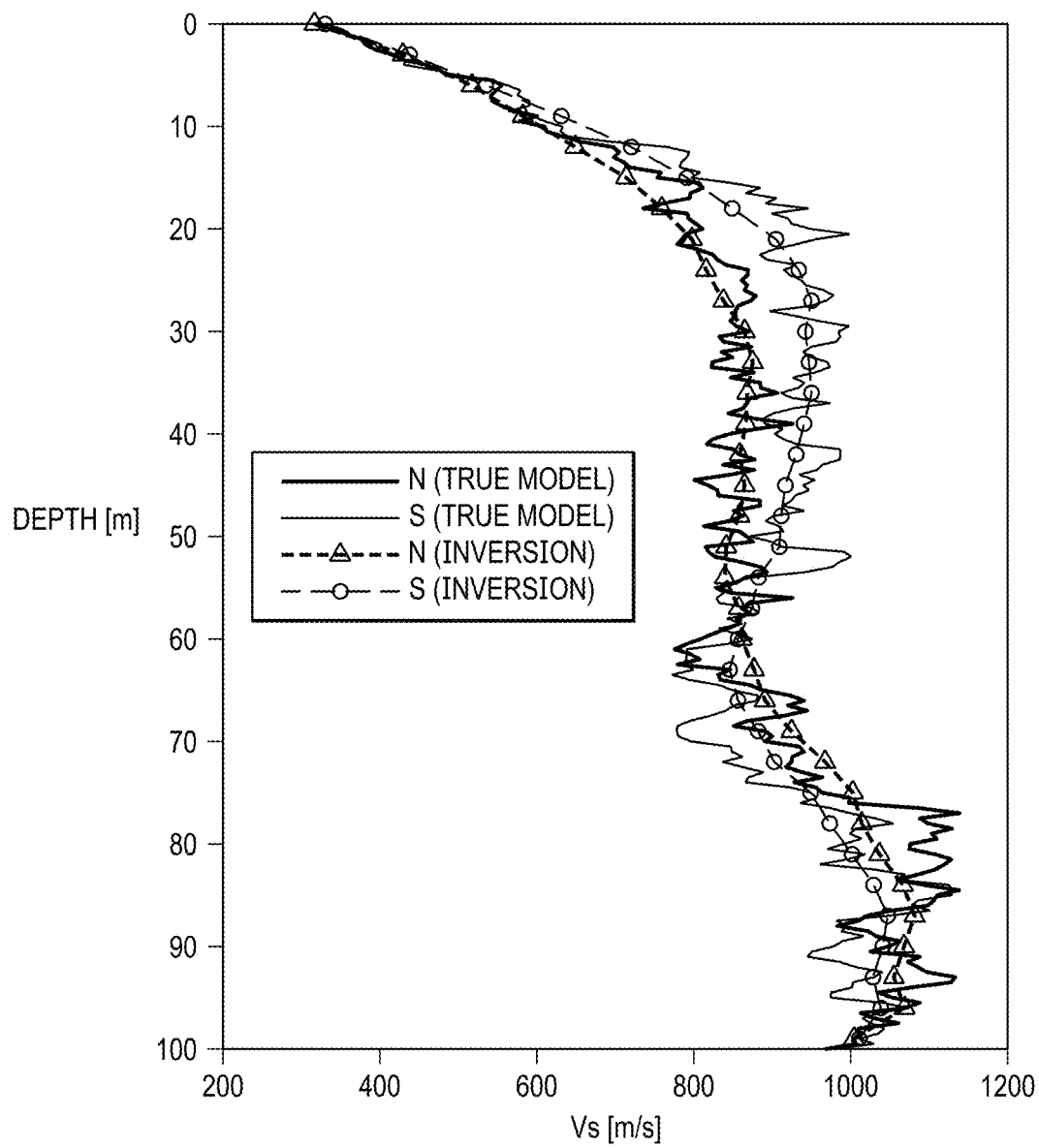
FIG. 18 presents the shear wave velocity model generated by inverting these curves.

This systems and methods described in this specification produce a dispersion volume that can be inverted to produce a shear wave velocity volume. The approach based on the 1D assumption cannot generate a dispersion volume as it is using only nearest shots and receiver lines. This approach only provides two dispersion curves related to the northern and southern receivers shown in FIG. 14. FIG. 17 presents these dispersion curves. FIG. 18 presents the shear wave velocity model generated by inverting these curves. For the 1D approach, the velocity model provides velocity as function of depth at one point for each receiver line. FIG. 18 also compares the velocity model at these two points with the synthetic data. Although the velocity model generated by the 1D approach generally corresponds to the synthetic data at these two points, it does not capture the heterogeneities in the formation that are visible in FIGS. 15 and 16. For example, the velocity at 20 m ranges from ~800 m/s to ~1200 m/s.

Figure 19:
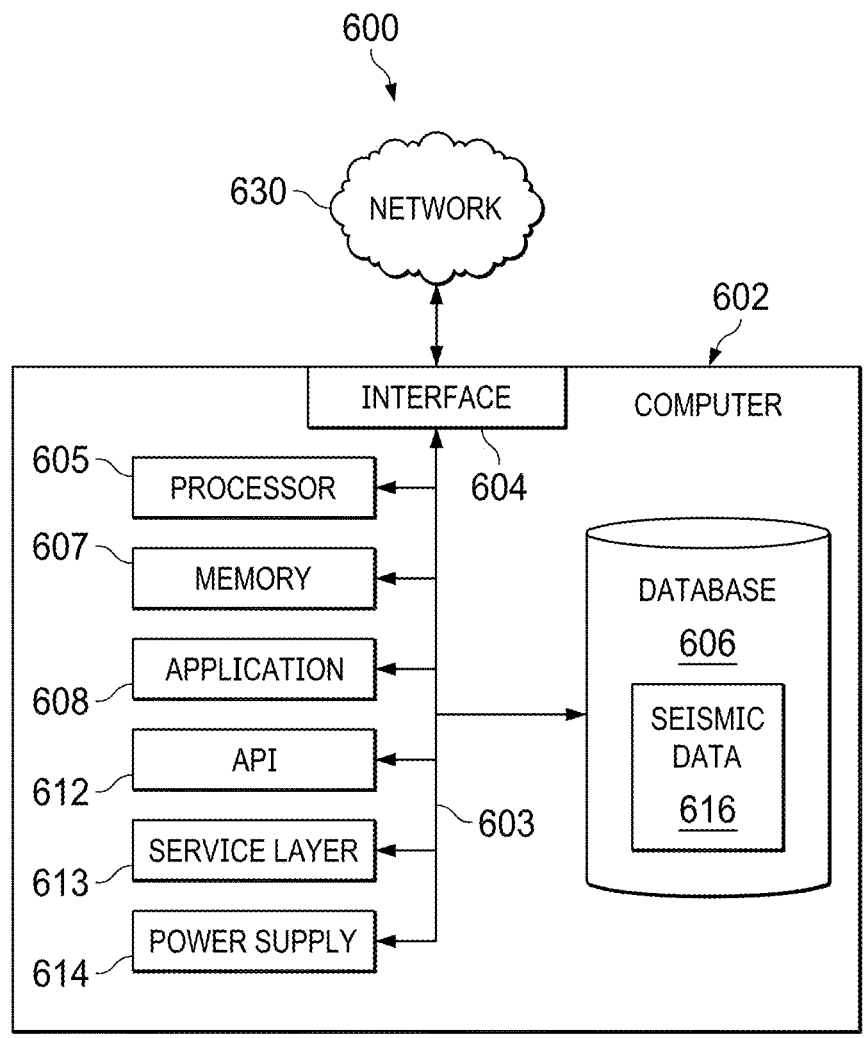
FIG. 19 is a block diagram illustrating an example computer system used to provide computational functionalities associated with described algorithms, methods, functions, processes, flows, and procedures as described in the present disclosure, according to some implementations of the present disclosure.

FIG. 19 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the hardware of the interface can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data (for example, seismic data 616) for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure.

Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for identifying near-surface heterogeneities in a subterranean formation using surface seismic arrays, the method comprising:

recording raw seismic data using sensors at a ground surface, the seismic data comprising a plurality of cross shot seismic signals generated from a plurality of sources forming a two-dimensional plane with at least one sensor of the sensors at the ground surface, wherein the at least one sensor is configured to receive at least two cross shot seismic signals of the plurality;

applying a band pass filter to one of the at least two cross shot seismic signals received at the at least one sensor, the band pass filter using a central frequency;

picking a phase arrival time for the filtered data;

generating an initial starting phase velocity model for tomographic inversion from the raw seismic data;

applying tomographic inversion to the filtered data to generate a dispersion map associated at the central frequency;

repeating, for other cross shot seismic signals at the at least one sensor, band pass filtering, picking a phase arrival time, generating an initial starting velocity model, and applying tomographic inversion steps for each of a set of central frequencies; and generating a three-dimensional dispersion volume that shows spatial variations in a propagation speed of the at least two cross shot seismic signals of the plurality received at the at least one sensor, the dispersion volume representing near-surface conditions in the subterranean formation by combining the dispersion maps.

2. The method of claim 1, further comprising running a one-dimensional surface wave inversion on the three-dimensional dispersion volume to generate a shear wave velocity model representing near-surface conditions in the subterranean formation.

3. The method of claim 1, wherein the set of central frequencies comprises a plurality of equally spaced central frequency between 0 and 30 Hz.

4. The method of claim 1, wherein generating the initial starting velocity model for tomographic inversion from the raw seismic data comprises extracting a two-dimensional seismic profile from the raw seismic data.

5. The method of claim 4, wherein generating the initial starting velocity model for tomographic inversion from the raw seismic data further comprises extracting a dispersion curve from the two-dimensional seismic profile by picking a fundamental mode in a frequency wavenumber domain.

6. The method of claim 5, wherein generating the initial starting velocity model for tomographic inversion from the raw seismic data further comprises extracting a phase velocity extracted from the dispersion curve at the central frequency.

7. The method of claim 1, wherein recording raw seismic data using the sensors at ground surface comprises recording raw seismic data using a two-dimensional array of seismic sources and seismic sensors at the ground surface.

8. The method of claim 7, wherein the two-dimensional array of seismic sources and seismic sensors at the ground surface comprises multiple shotlines and multiple receiver lines, wherein one or more receivers on a receiver line is configured to receive the multiple shotlines.

9. The method of claim 8, wherein applying the band pass filter to the raw seismic data using the central frequency comprises applying the band pass filter to the raw seismic data associated with multiple shots from each shotline and multiple sensors from each receiver line using the central frequency.

10. The method of claim 1, wherein output of the tomographic inversion is a phase velocity volume at each spatial position and each discrete frequency.

11. A system configured for identifying near-surface heterogeneities in a subterranean formation using surface seismic arrays, the system comprising:

at least one processor; and a memory storing instructions that, when executed by the at least one processor, cause the at least one processor to perform operations comprising:

receiving seismic data comprising a plurality of cross shot seismic signals generated from a plurality of sources forming a two-dimensional plane with at least one sensor of the sensors at the ground surface, wherein the at least one sensor is configured to receive at least two cross shot seismic signals of the plurality;

applying a band pass filter one of the at least two cross shot seismic signals received at the at least one sensor, the band pass filter using a central frequency to raw seismic data associated with an array of seismic sources and seismic sensors at the ground surface;

picking a phase arrival time for the filtered data;

generating an initial starting velocity model for tomographic inversion from the raw seismic data;

applying tomographic inversion to the filtered data to generate a dispersion map associated at the central frequency;

repeating, for other cross shot seismic signals at the at least one sensor, the band pass filtering, picking a phase arrival time, generating an initial starting velocity model, and applying tomographic inversion steps for each of a set of central frequencies; and generating a three-dimensional dispersion volume that shows spatial variations in a propagation speed of the at least two cross shot seismic signals of the plurality received at the at least one sensor, the dispersion volume representing near-surface conditions in the subterranean formation by combining the dispersion maps.

12. The system configured of claim 11, further comprising running a one-dimensional surface wave inversion on the three-dimensional dispersion volume to generate a shear wave velocity model representing near-surface conditions in the subterranean formation.

13. The system of claim 11, wherein the set of central frequencies comprises a plurality of equally spaced central frequency between 0 and 30 Hz.

14. The system of claim 11, wherein generating the initial starting velocity model for tomographic inversion from the raw seismic data comprises extracting a two-dimensional seismic profile from the raw seismic data.

15. The system of claim 14, wherein generating the initial starting velocity model for tomographic inversion from the raw seismic data further comprises extracting a dispersion curve from the two-dimensional seismic profile by picking a fundamental mode in a frequency wavenumber domain.

16. The system of claim 15, wherein generating the initial starting velocity model for tomographic inversion from the raw seismic data further comprises extracting a phase velocity extracted from the dispersion curve at the central frequency.

17. The system of claim 11, wherein recording raw seismic data using the sensors at ground surface comprises recording raw seismic data using a two-dimensional array of seismic sources and seismic sensors at the ground surface.

18. The system of claim 17, wherein the two-dimensional array of seismic sources and seismic sensors at the ground surface comprises multiple shotlines and multiple receiver lines, wherein one or more receivers on a receiver line is configured to receive the multiple shotlines.

19. The system of claim 18, wherein applying the band pass filter to the raw seismic data using the central frequency comprises applying the band pass filter to the raw seismic data associated with multiple shots from each shotline and multiple sensors from each receiver line using a central frequency.

20. The system of claim 11, wherein output of the tomographic inversion is a phase velocity volume at each spatial position and each discrete frequency.

* * * * *